(12) United States Patent
Nicholas et al.

(10) Patent No.: US 11,174,029 B2
(45) Date of Patent: Nov. 16, 2021

(54) OUTBOARD FACING HERRINGBONE SEATING ARRANGEMENT

(71) Applicant: Acumen Design Associates Ltd., London (GB)

(72) Inventors: Richard Nicholas, London (GB); Andrew Williams, London (GB); Jonathan Fenton, Greenwich (GB)

(73) Assignee: Acumen Design Associates Ltd., London (GB)

( * ) Notice: Subject to any disclaimer, the term of this patent is extended or adjusted under 35 U.S.C. 154(b) by 0 days.

(21) Appl. No.: 17/158,680

(22) Filed: Jan. 26, 2021

(65) Prior Publication Data

US 2021/0276716 A1 Sep. 9, 2021

(30) Foreign Application Priority Data

Mar. 6, 2020 (GB) ..................... 2003337

(51) Int. Cl.
*B64D 11/06* (2006.01)

(52) U.S. Cl.
CPC ...... *B64D 11/0601* (2014.12); *B64D 11/0606* (2014.12)

(58) Field of Classification Search
CPC ............ B64D 11/0601; B64D 11/0606; B64D 11/064; B64D 11/0641; B64D 11/0644
See application file for complete search history.

(56) References Cited

U.S. PATENT DOCUMENTS

| 7,178,871 | B1 | 2/2007 | Round et al. |
| 7,918,504 | B2 | 4/2011 | Thompson |
| 2007/0262625 | A1* | 11/2007 | Dryburgh ............... B64D 11/00 297/249 |
| 2009/0243352 | A1* | 10/2009 | Cailleteau .......... B64D 11/0601 297/188.01 |
| 2010/0308164 | A1* | 12/2010 | McKeever ......... B64D 11/0606 244/118.6 |
| 2012/0139305 | A1* | 6/2012 | Baumann ........... B64D 11/0646 297/188.14 |
| 2015/0008714 | A1* | 1/2015 | Erhel ................... B60N 2/2222 297/284.4 |

(Continued)

FOREIGN PATENT DOCUMENTS

| GB | 2326824 A | 6/1999 |
| GB | 2572446 A | 2/2019 |

(Continued)

OTHER PUBLICATIONS

International Search Report of the International Searching Authority in GB2003337.9, dated Dec. 1, 2020, 2 pages.

(Continued)

*Primary Examiner* — Philip J Bonzell
*Assistant Examiner* — Tye William Abell
(74) *Attorney, Agent, or Firm* — Sterne, Kessler, Goldstein & Fox P.L.L.C.

(57) ABSTRACT

A passenger seating arrangement in an aircraft cabin including a column of seat units located adjacent an aisle. A seat unit, or a neighboring seat unit, of the column is configurable into a PRM-access configuration in which the seat module is moved to temporarily widen an access opening from a first width to a second width, greater than the first width, for enabling a disabled passenger to access the seat unit.

25 Claims, 19 Drawing Sheets

(56) References Cited

U.S. PATENT DOCUMENTS

| | | | |
|---|---|---|---|
| 2017/0259923 A1* | 9/2017 | Morgan | B64D 11/0644 |
| 2019/0300177 A1* | 10/2019 | Nicholas | B64D 11/0604 |
| 2020/0047641 A1* | 2/2020 | D'Eramo | A47C 3/04 |

FOREIGN PATENT DOCUMENTS

| | | | |
|---|---|---|---|
| GB | 2572556 A | | 9/2019 |
| WO | 03013903 A1 | | 2/2003 |
| WO | 2014064525 A2 | | 5/2014 |
| WO | 2018093825 A1 | | 5/2018 |

OTHER PUBLICATIONS

Thompson Aero Seating, 'The Vantage Seating Range' product brochure, 19 pages.
International Searching Authority issued in International Application No. PCT/GB2021/050523, dated May 18, 2021, 14 pages.

\* cited by examiner

OUTBOARD FACING HERRINGBONE SEATING ARRANGEMENT

FIELD OF THE INVENTION

The present invention relates to a passenger seating arrangement, and to sets of seat units for use in a passenger seating arrangement.

BACKGROUND OF THE INVENTION

Aircraft passenger seating arrangements having convertible seat units that have both a seat configuration, and a flat-bed configuration are well-known. These convertible seat units are typically provided in premium class (e.g. business class and/or first class) cabins of an aircraft. In the seat configuration, the seat unit typically provides a relatively upright seat, whereas in the flat-bed configuration, the seat unit tends to provide a substantially planar sleeping surface for supporting the passenger. The seat units shown in GB2326824 (British Airways), WO03013903 (Virgin Atlantic) and U.S. Pat. No. 7,178,871 (British Airways) are examples of such convertible seat units (often referred to as having 'lie-flat' seats) that have both a seat configuration, and a flat-bed configuration which offers improved comfort over a reclined seat.

Legislation, such as the Air Carrier Access legislation in the USA, prohibits discrimination on the basis of disability in air travel. For example, Title 14 CFR Part 382 sets out the rules followed by the US Department of Transportation (DOT) for all flights of U.S. airlines, and to flights to or from the United States by foreign airlines.

In many premium class seating arrangements, the DOT requirements tend to be inherently met because access to the seats tends to already be relatively spacious as a result of the relatively large seat units/low PAX-density (i.e. low numbers of passengers per unit area in the cabin), that are desirable within business or first class.

GB2326824 and WO03013903 mentioned above are examples of so-called inboard facing herringbone arrangements in a business class arrangement, in which the seats are orientated at an angle to the longitudinal axis of the aircraft and face inwardly towards the aisle. For arrangements requiring relatively high herringbone angles/low pitches, the width of the access opening for each seat in this type of herringbone arrangement may necessarily become relatively narrow (i.e. the spacing between adjacent foot-ends of the seat units becomes correspondingly narrow as the herringbone angle increases/pitch decreases). This narrow width of the access opening may become problematic for compliance with the above-mentioned DOT requirements. This is especially the case on narrow-body (e.g. single-aisle) aircraft, where high angle/low pitch arrangements tend to be needed in order to efficiently use the available cabin space.

In this respect, herringbone layouts for narrow-body aircraft have tended to be dismissed within the aircraft industry as impractical because the required access width has been thought to be unachievable. Instead, there tends to be a preference for in-line arrangements such as those suggested in U.S. Pat. No. 7,918,504 (Thompson). U.S. Pat. No. 7,918,504 discloses an aircraft cabin in which there are rows of seat units, each unit having a forward facing lie-flat seat that faces in a direction parallel to the longitudinal axis of the cabin.

Notwithstanding the known in-line arrangements, some herringbone arrangements for narrow-body aircraft have more recently been suggested. GB2572556 shows an inboard facing herringbone arrangement in a business class arrangement. The arrangement in GB2572556 has a low pitch and high angle, and achieves a relatively high passenger density. Access for Persons with Reduced Mobility (PRMs) has been achieved in GB2572446 by implementing a movable panel at the foot of the ottoman, which widens the access path to the seat and enables the person of reduced mobility (PRM) access to the seat unit.

There is a desire to provide other possible configurations, that provide both a high-density passenger seating arrangements and also achieve suitable access for persons of reduced mobility (PRMs).

SUMMARY OF THE INVENTION

According to a first aspect of the invention, there is provided a passenger seating arrangement in an aircraft cabin, the passenger seating arrangement comprising a column of seat units located adjacent an aisle, the column of seat units and the aisle both extending in a longitudinal direction parallel to the longitudinal axis of the aircraft cabin. The column comprises a multiplicity of seat units, arranged consecutively along the longitudinal direction. Each seat unit comprises a seat module. The seat module may be at one end of the seat unit. The seat unit may comprise a foot-receiving structure at the other end of the seat unit. The seat module comprises a seat pan, a seat back and a shroud enclosing the rear of the seat back. Each seat unit is configurable between a seating configuration and a flat-bed configuration. Each seat unit is orientated at an acute angle to the longitudinal direction and faces outwardly away from the aisle. The spacing between a seat pan of a seat unit in the column and the shroud of a neighboring seat unit in the column defines an access opening for accessing that seat unit from the aisle. The access opening has a first width for access by an able-bodied passenger. The seat unit, or the neighboring seat unit, is configurable into a PRM-access configuration in which the seat module is moved to temporarily widen the access opening from the first width to a second width, greater than the first width, for enabling a disabled passenger to access the seat unit.

By providing a seat module that is moveable, the access opening can be widened to the second width, and a relatively space-efficient outboard-facing seating arrangement can be provided, whilst still enabling access for PRMs when required. The PRM-access configuration preferably allows a PRM access to the seat unit in a dignified manner.

In the PRM-access configuration, the access opening is temporarily widened. After the passenger's access or egress to/from the seat unit, the seat unit may be reconfigured out of the PRM-access configuration.

After the passenger's access or egress to/from the seat unit, the associated seat unit (or neighboring seat unit) may be reconfigured out of the PRM-access configuration. The seat unit is preferably repeatedly configurable into/out of the PRM-access configuration. For example the seat unit may be repeatedly configurable between an able-bodied access configuration (typically the default configuration which may be a taxi, take-off and landing (TTOL) position), and the PRM-access configuration. It will be appreciated that the access opening can therefore be repeatedly widened/narrowed between the first and second widths as required for repeated access/egress to/from the seat unit.

It will be appreciated that the term PRM may be interchangeable with synonymous terminology. For example, a PRM may also be referred to, in some circumstances, as a disabled passenger.

Each seat unit is orientated at an acute angle to the longitudinal direction and faces outwardly away from the aisle. Such an arrangement is often referred to as an outwardly-facing herringbone arrangement.

In principle, aspects of the present invention may be applicable to both forward facing and rearward facing outward facing herringbone layouts. The seat units are preferably forward facing (i.e. the seat module of each unit is further aft than the foot receiving end).

Each seat unit is configurable between a seating configuration and a flat-bed configuration. Each seat unit may comprise one or more moveable elements that form part of a seating surface in the seat configuration and form part of a bed surface in the bed configuration. The moveable elements may comprise the seat pan and the seat back.

Unless otherwise specified, features of the seat unit are typically described herein with reference to their arrangement in the able-bodied access configuration. Unless otherwise specified, a description of moving the seat unit to the PRM-access configuration, is typically made with reference to movement away from the able-bodied configuration.

Reference herein is made to an access opening. It will be appreciated that the access opening may also be used for egress from the seat unit. Features of the access opening may be equally applicable to when the opening is an egress opening, for example when a passenger exits a seat unit.

A plurality of the seat units may be configurable into the PRM-access configuration, for enabling PRM access to a plurality of the seat units. A plurality, and preferably a multiplicity, of the seat units may be configurable into the PRM-access configuration, for enabling PRM-access to at least 50% of the seat units. All of the multiplicity of seat units may be configurable into the PRM-access configuration. Of the seat units that are configurable into the PRM-access configuration, those seat units are preferably substantially identical. Preferably all of the seat units are substantially identical.

In each seat unit, the seat module (in the able-bodied access configuration) is preferably orientated at the acute angle to the longitudinal direction and face outwardly, away from the aisle, towards the windows on the aircraft fuselage. The seat pan and seat back may comprise a central axis. The central axis preferably extends through the center of the seat pan and the seat back (for example it may bisect the seat pan and/or seat back of the seat when in the seating configuration). The angle of the seat unit is preferably defined as the angle between the longitudinal axis of the seat unit and the longitudinal direction of the cabin. In some embodiments, the angle of the seat unit may be defined as the angle between a line defining the maximum useable bed length, and the longitudinal direction.

In some embodiments, the width of the access opening may vary with height from the cabin floor. The first width of the access opening is preferably measured at a first height from the cabin floor. The second width is preferably measured at the same height as the first width.

The first width may be the minimum width of the access opening. Thus, the first height may be a height at which the access opening is narrowest. The minimum width is preferably no less than 8 inches. Providing an arrangement in which the minimum width is increased (to the second width) may be beneficial because it tends to ensure what is likely to be the most problematic part of the opening (i.e. the narrowest part) is widened to allow PRM access.

When the access opening is temporarily widened from the first width to the second width, the access opening is preferably no narrower than the second width, above the first height.

In some embodiments, the second width may be comparable to, or at least the magnitude of, the width of the aisle. The second width may be substantially equal to the width of the aisle. For example, the aisle may be at least 17 inches wide. The second width may be 20 inches, or more, wide. The aisle width is typically sufficient for PRM access along the aisle (e.g. for a wheelchair), so matching the second width with the aisle width tends to ensure there will be adequate PRM access into the seat unit too. The aisle may have a minimum aisle width. The magnitude of the second width may be at least the same as the minimum aisle width. The minimum aisle width may be measured at less than 25 inches from the floor. The minimum aisle width may be measured at less than the height of the seat pan.

In some embodiments, the second width need not necessarily be as wide as the aisle width, but improved accessibility may be provided by presenting the seat module in a more accessible position to the passenger. For example, in some embodiments the seat module may be moved to a location proximate to the passenger (as well as the access opening being enlarged to the second width). For example, in some embodiments the seat module may be rotated such that it presents a surface that is closer to parallel to the orientation of the passenger when accessing the seat, thereby facilitating an easier transfer (as well as the access opening being enlarged to the second width).

Embodiments of the invention may utilize various different movements of the seat module to temporarily enlarge the access opening.

Each seat unit may comprise a longitudinal axis orientated at the acute angle to the longitudinal direction. In some embodiments, in the PRM-access configuration the seat module is moved in a direction along the longitudinal axis of the seat unit. The seat module may be moved in a direction along the longitudinal axis of the seat unit and into the aisle. Such an arrangement tends to widen the access opening to the seat unit whose seat module is moved into the aisle.

In some embodiments, the neighboring seat unit is configurable into the PRM-access configuration, and the seat module (of the neighboring seat unit) is moved in a direction along the longitudinal axis of the seat unit and away from the aisle. Such an arrangement tends to widen the access opening to the seat unit that is neighboring the seat module that is moved into the aisle.

In some embodiments of the invention, two seat units may adopt the PRM-access configuration. The neighboring seat unit, and the seat unit being accessed may be configurable into a PRM-access configuration. The seat module (of the seat unit being access) may be moved in a direction along the longitudinal axis of the seat unit and into the aisle, and the seat module of the neighboring seat unit may be moved in a direction along the longitudinal axis of the seat unit and away from the aisle.

In some embodiments, in the PRM-access configuration the seat module may be moved in the longitudinal direction parallel to the longitudinal axis of the aircraft cabin. In the PRM-access configuration the seat module may be moved in the longitudinal direction towards the aft of the cabin. Such an arrangement tends to widen the access opening to the seat unit whose seat module is moved aft. The seat module may be moved aft to a position in which it abuts the neighboring, aftward, seat module.

In some embodiments the neighboring seat unit may be configurable into the PRM-access configuration, and the seat module may be moved in the longitudinal direction towards the fore of the cabin. Such an arrangement tends to widen the access opening to the seat unit that is neighboring the seat module that is moved into the aisle.

In some embodiments the seat unit, and the neighboring seat unit, may be configurable into a PRM-access configuration, in which the seat module of the seat unit is moved in the longitudinal direction towards the aft of the cabin, and the seat module of the neighboring seat unit is moved in the longitudinal direction towards the fore of the cabin.

In some embodiments, in the PRM-access configuration the seat module is moved via a rotational movement. The rotational movement may be about an axis of rotation. The axis of rotation may be substantially normal to the cabin floor. The axis of rotation is preferably fixed. The seat module may be fixedly mounted on a plinth. The plinth may be rotatable about the axis of rotation. The plinth may be rotatable through an arc of a circle, but may not necessarily be rotatable through a full circular rotation. The seat module may be offset from the axis of rotation such that the seat module is positioned eccentrically on the plinth.

In some embodiments, in the PRM-access configuration the seat module may be rotated in a direction to move the seat module towards the aft of the cabin. The rotational movement towards the aft of the cabin may be such that the access opening is widened towards the aft of the cabin. Such an arrangement tends to widen the access opening to the seat unit whose seat module is rotated aft. An arrangement in which the seat module is rotated in this manner has been found to be especially beneficial because the seat module tends to present (when rotated) a surface that is more closely aligned with the orientation of the PRM when seeking to transfer onto the seat pan. The seat module, when rotated, may be at a smaller acute angle to the longitudinal direction, than when the seat unit is in the able-bodied access configuration.

In some embodiments, the neighboring seat unit may be configurable into the PRM-access configuration, and the seat module (of the neighboring seat unit) may be rotated in a direction to move the seat module towards the fore of the cabin. Such an arrangement tends to widen the access opening to the seat unit that is neighboring the seat module that is rotated towards the fore of the cabin.

In some embodiments the seat unit, and the neighboring seat unit, are configurable into a PRM-access configuration. The seat module of the seat unit may be rotated in a direction to move the seat module towards the aft of the cabin, and the seat module of the neighboring seat unit may be rotated in a direction to move the seat module towards the fore of the cabin.

Each seat unit may comprise a privacy screen for shielding the seat unit from the neighboring seat unit. The shroud of each seat module may adjoin an end of the privacy screen. For the seat modules that are moveable, the shroud may be connected, for example flexibly connected, to the end of the privacy screen to allow relative movement between the shroud and the screen during movement to and from the PRM-access configuration. The privacy screen may house an In-Flight Entertainment (IFE) monitor.

In some embodiments, the seat units may be arranged such that in the PRM-access configuration, there is provided a transfer surface for transferring the passenger into the seat unit. The transfer surface may be substantially coplanar with the seat pan. The transfer surface may be a dedicated surface deployed when in the PRM-access configuration. In preferred embodiments the seat module may comprise an armrest, and wherein the armrest is moveable from a raised position for supporting a passenger's arms, to an access position for facilitating access to the seat unit. In the access position, the armrest may be lowered such that it is substantially flush with the seat pan of the seat module. When the seat unit is in the PRM-access configuration, the armrest may be in the access position.

Embodiments have been found to be especially beneficial for use on relatively high angle/low pitch layouts. The acute angle at which the seating elements are orientated to the longitudinal direction may be 45 degrees. The acute angle at which the seating elements are orientated to the longitudinal direction may be 44 degrees. The acute angle at which the seating elements are orientated to the longitudinal direction may be 43 degrees. The acute angle at which the seating elements are orientated to the longitudinal direction may be 42 degrees. The acute angle at which the seating elements are orientated to the longitudinal direction may be 41 degrees. The acute angle at which the seating elements are orientated to the longitudinal direction may be 46 degrees. The acute angle at which the seating elements are orientated to the longitudinal direction may be 47 degrees. The acute angle at which the seating elements are orientated to the longitudinal direction may be 48 degrees. The acute angle at which the seating elements are orientated to the longitudinal direction may be between 41 and 48 degrees. The acute angle at which the seating elements are orientated to the longitudinal direction may be between 43 and 45 degrees. The acute angle at which the seating elements are orientated to the longitudinal direction may be substantially equal to 44 degrees.

The pitch between consecutive seat units in the column may be less than 35 inches. It will be appreciated that the pitch is defined as the distance, along the longitudinal direction, between two corresponding common points on adjacent seat units. The pitch between consecutive seat units in the column may be less than 34 inches. The pitch between consecutive seat units in the column may be less than 36 inches. The pitch between consecutive seat units in the column may be less than 37 inches. The pitch between consecutive seat units in the column may be between 31 and 35 inches. The pitch between consecutive seat units in the column may be between 32 and 34 inches. The pitch between consecutive seat units in the column may be between 30 and 36 inches. The pitch between consecutive seat units in the column may be between 31 and 36 inches. The pitch between consecutive seat units in the column may be substantially equal to 33 inches.

In the flat-bed configuration, the bed length may be at least 75 inches. In the flat-bed configuration, the bed length may be between 78 and 80 inches. In the flat-bed configuration, the bed length may be between 76 and 80 inches. In the flat-bed configuration, the bed length may be between 77 and 80 inches. In the flat-bed configuration, the bed length may be between 77 and 81 inches.

Embodiments have been found to be especially beneficial for use on narrow body aircraft. The column of seat units may be adjacent the aisle on one side, and adjacent the aircraft sidewall on the other side. The cabin may comprise a second column of seat units on the opposite side of the aisle, the second column being arranged as described with reference to the first column. The aisle may extend along the center line of the cabin. The second column may be adjacent the aisle on one side, and adjacent the aircraft sidewall on the other side. Thus, the seating arrangement may be on a single-aisle aircraft.

In some embodiments, each seat unit may comprise an armrest, preferably a fixed armrest, on the side of the seat unit furthest from the aisle. The armrest may be arranged to overhang a leg-receiving region of the neighboring seat unit, on the side of the neighboring seat unit closest to the aisle. The leg-receiving region is preferably arranged to receive a passenger's lower-leg when seated, and a passenger's upper leg (e.g. thigh) when laying with the seat unit in the flat-bed configuration. Having such an overhang has been found to enable a relatively low pitch, outwardly facing herringbone arrangement, to be provided without unduly narrowing each seat unit.

In some embodiments, the shroud of the seat module may adjoin the outer side of the fixed armrest, and when moved to the PRM-access configuration the shroud is separated from the fixed armrest.

According to another aspect of the invention, there is provided a passenger seating arrangement in an aircraft cabin, the passenger seating arrangement comprising a column of seat units located adjacent an aisle, the column of seat units and the aisle both extending in a longitudinal direction parallel to the longitudinal axis of the aircraft cabin, and wherein the column comprises a multiplicity of seat units, arranged consecutively along the longitudinal direction, and wherein each seat unit comprises a seat module at one end of the seat unit and a foot-receiving structure at the other end of the seat unit. Each seat unit is configurable between a seating configuration and a flat-bed configuration, and each seat unit is orientated at an acute angle to the longitudinal direction and faces outwardly away from the aisle. Each seat unit comprises a fixed armrest on the side of the seat unit furthest from the aisle, the armrest being arranged to overhang a leg-receiving region of the neighboring seat unit, on the side of the neighboring seat unit closest to the aisle. Having such an overhang has been found to enable a relatively low pitch, outwardly facing herringbone arrangement, to be provided without unduly narrowing each seat unit.

Each seat unit may comprise a feet-access recess on the side of the seat unit closest to the aisle. The leg-receiving region of each seat unit may overhang the respective feet-access recess of that seat unit. The feet-access recess is preferably located to allow passage of passenger's feet, as the passenger rotates into a seated position on the seat module. The leg receiving region and the feet-access recess may be partly formed by the seat module and partly formed by fixed side furniture, the seat unit being arranged such that the parts are separated when in the PRM-access configuration but adjoin to form a continuous region in the able-bodied access configuration. The arrangement may comprise a multiplicity of side furniture walls, extending between the side of each seat closest to the aisle. The leg receiving region and the feet-access recess may be formed in each side furniture wall.

The side furniture wall may comprise a first inflection at the transition between the feet-access recess and the leg receiving region and a second inflection at the transition between the leg receiving region and the fixed armrest of the neighboring seat unit. The inflections may be directly above one another.

In some embodiments, there is provided a multiplicity of seat units for forming the passenger seating arrangement described herein.

In some embodiments, there is provided a seat unit for use as one of the seat units in the passenger seating arrangement described herein.

In some embodiments, there is provided a seat module for use as one of the seat modules in the passenger seating arrangement described herein.

In some embodiments, there is provided method of providing access, for a PRM, to a seat unit in a passenger seating arrangement of an aircraft, the passenger seating arrangement comprising a multiplicity of seat units, wherein each seat unit is configurable between a seating configuration and a flat-bed configuration, and wherein each seat unit is orientated at an acute angle to the longitudinal direction and faces outwardly away from the aisle, and each seat unit having a respective access opening having a first width for access by an able-bodied passenger; and wherein the method comprises: moving a seat module of the seat unit, or of a neighboring seat unit, to temporarily configure the seat unit into a PRM-access configuration in which the access opening is widened from the first width to a second width, greater than the first width, for enabling a disabled passenger to access the seat unit. The step of moving the seat module may comprise rotating the seat module about an axis of rotation.

In some embodiments there is provided an outwardly-facing herringbone arrangement of lie-flat seat units for an aircraft, wherein each seat unit comprises a seat module having a seat pan, a backrest and a shroud and wherein the spacing between the seat pan of each seat module and shroud on the seat module of the adjacent seat unit defines an entrance way for accessing the seat unit, the entrance way having a minimum width. The seat module of at least one of the seat units is moveable to temporarily enlarge the minimum width of the entrance way, thereby facilitating PRM-access to the seat unit. The seat module may be fixedly mounted on a rotatable plinth, the plinth being rotatable to rotate the seat module towards the rear of the cabin, thereby temporarily opening up the width of the entrance way.

It will of course be appreciated that features described in relation to some embodiments may be incorporated into other embodiments. For example, the method of an embodiment may incorporate any of the features described with reference to apparatuses of other embodiments and vice versa. Features from a seating arrangement according to one aspect, may be incorporated into the seating arrangement according to another aspect and vice versa.

DESCRIPTION OF THE DRAWINGS

Embodiments of the present invention will now be described by way of example only with reference to the accompanying schematic drawings of which.

DETAILED DESCRIPTION

Figure 1:
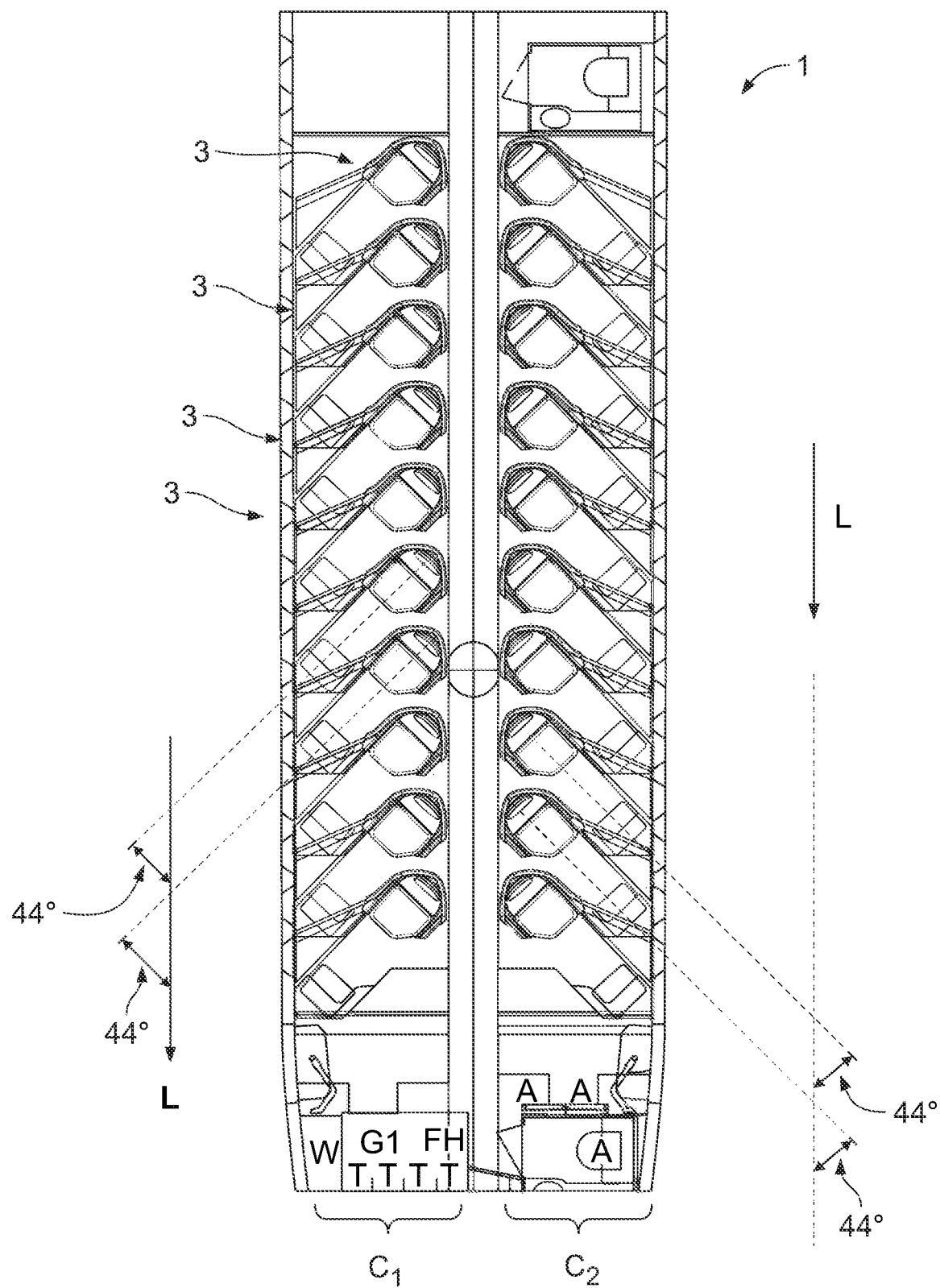
FIG. 1 is a plan view of a seating arrangement according to a first embodiment of the invention.

FIG. 1 shows a cabin 1 in an aircraft in which two columns of seat units C1 C2 according to a first embodiment of the invention are installed. The passenger seating arrangement of the first embodiment is located in an aircraft cabin 1 of a narrow body aircraft such as a Boeing 757-200, or 737-900. The passenger seating arrangement comprises a column C1 of seat units 3 located adjacent a single aisle 5 running along the center of the aircraft cabin 1. The column C1 of seat units 3 and the aisle 5 both extend in a longitudinal direction (L) parallel to the longitudinal axis of the aircraft cabin.

The column C1 comprises a multiplicity of seat units 3, arranged consecutively along the longitudinal direction. A second column C2 is located the other side of the aisle 5 and is substantially symmetrical with the first column, across the aisle 5. Features described herein tend to be described with reference to the first column C1, but it will be appreciated that corresponding features are also found in the other column C2 of seat units.

Figure 2:
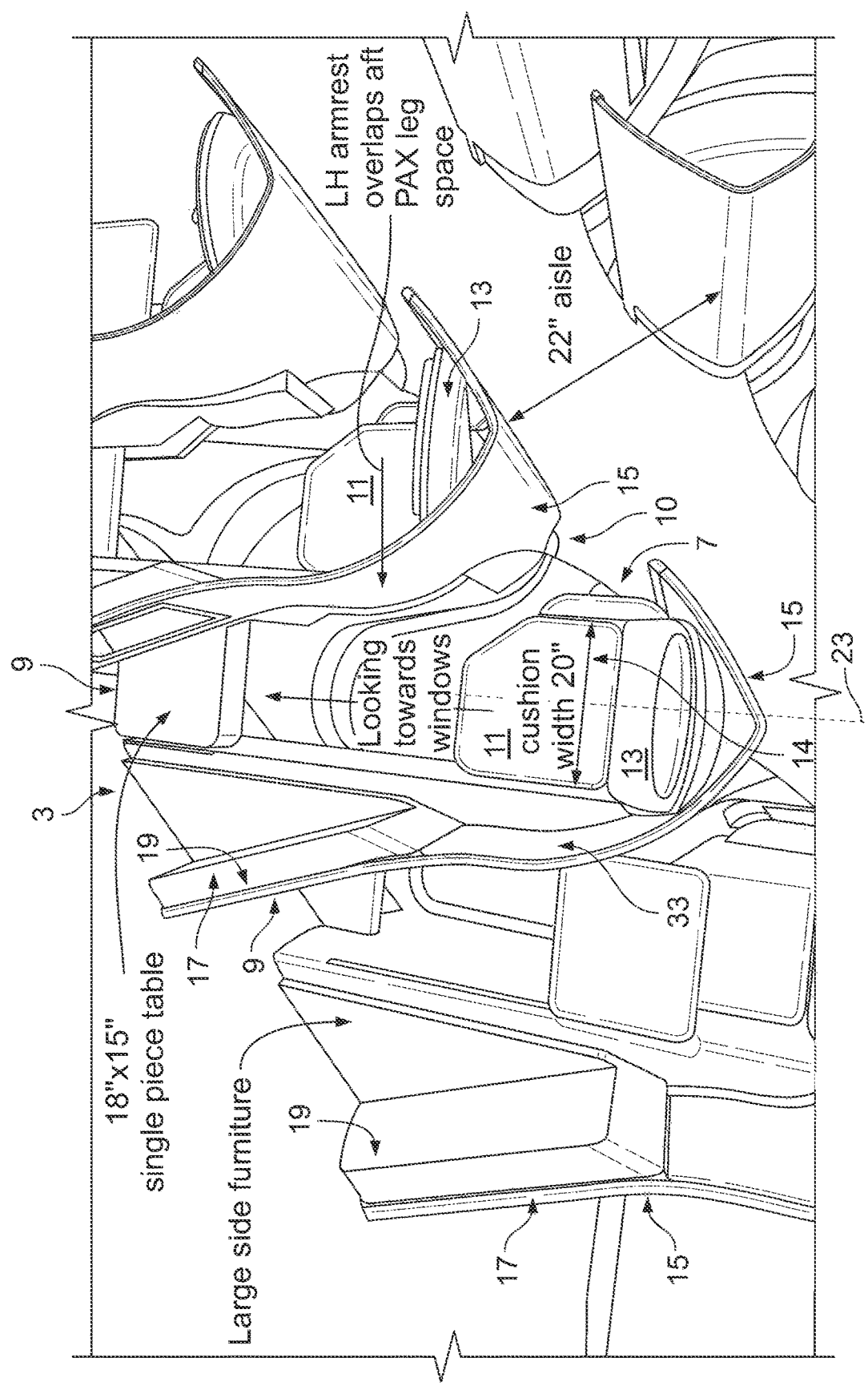
FIGS. 2 and 3 are perspective views from above of part of the arrangement in FIG. 1.
Figure 3:
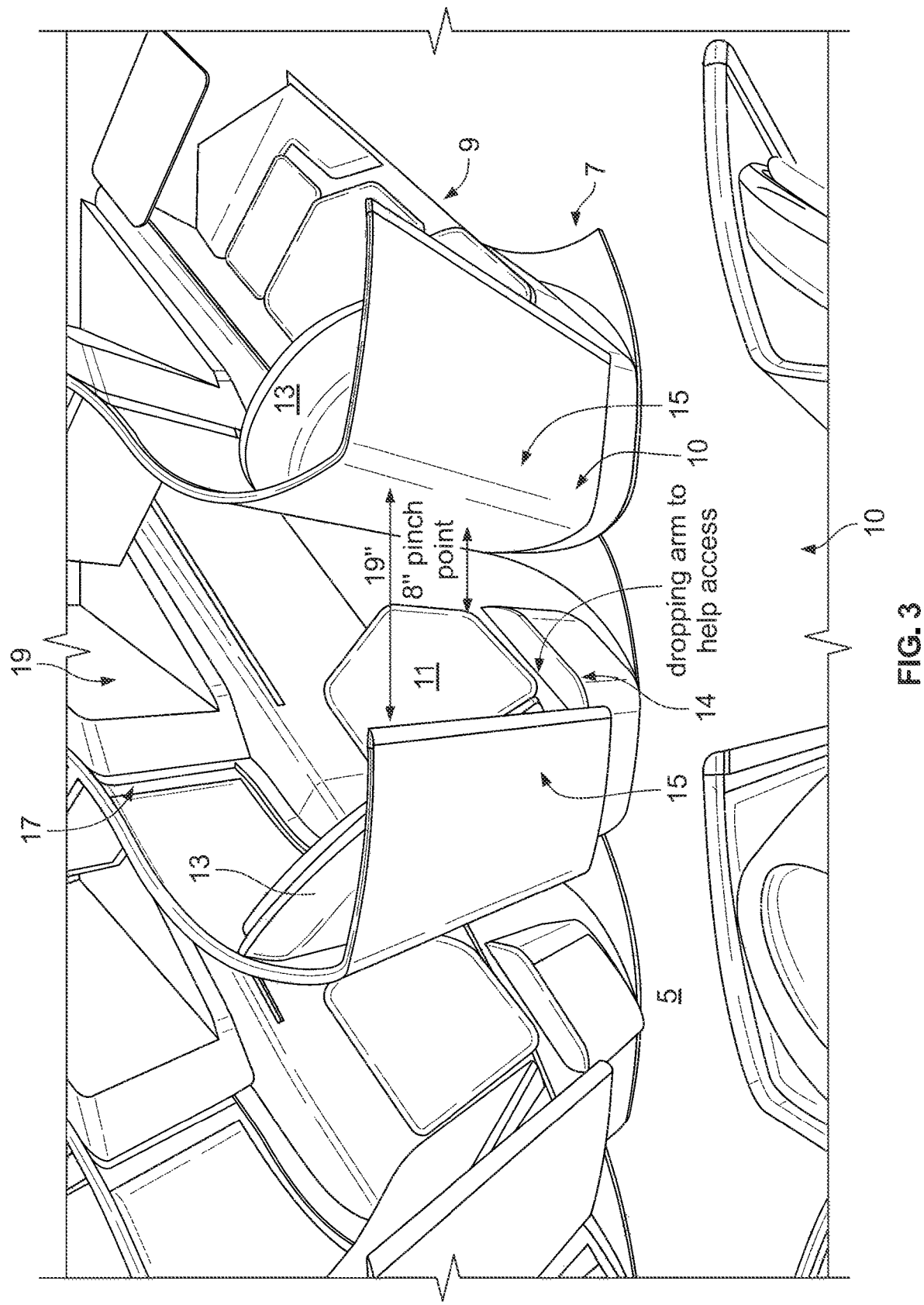
Figure 4:
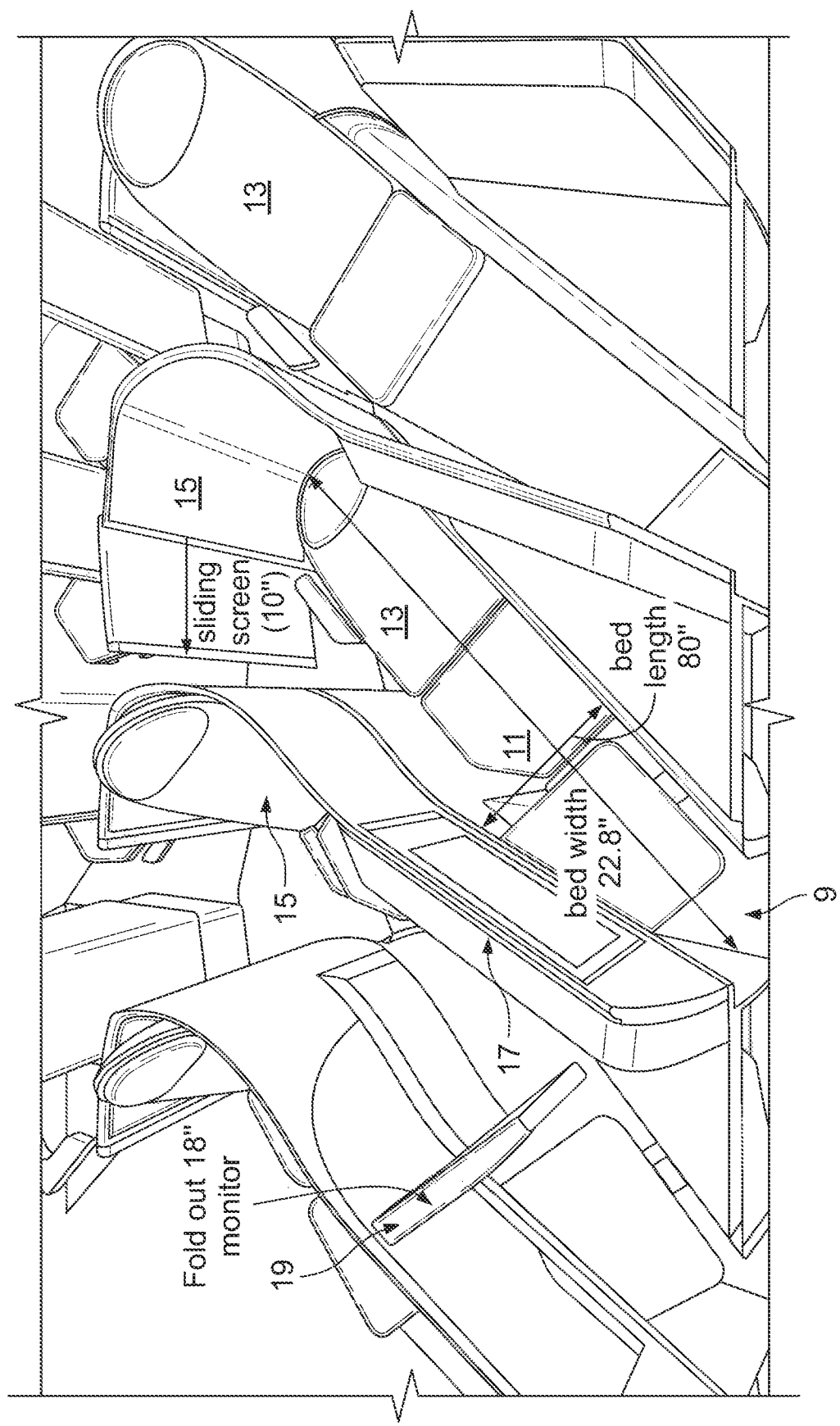
FIG. 4 is a perspective view from above of part of the arrangement in FIG. 1 but with the seat unit in a flat-bed configuration.
Figure 5:
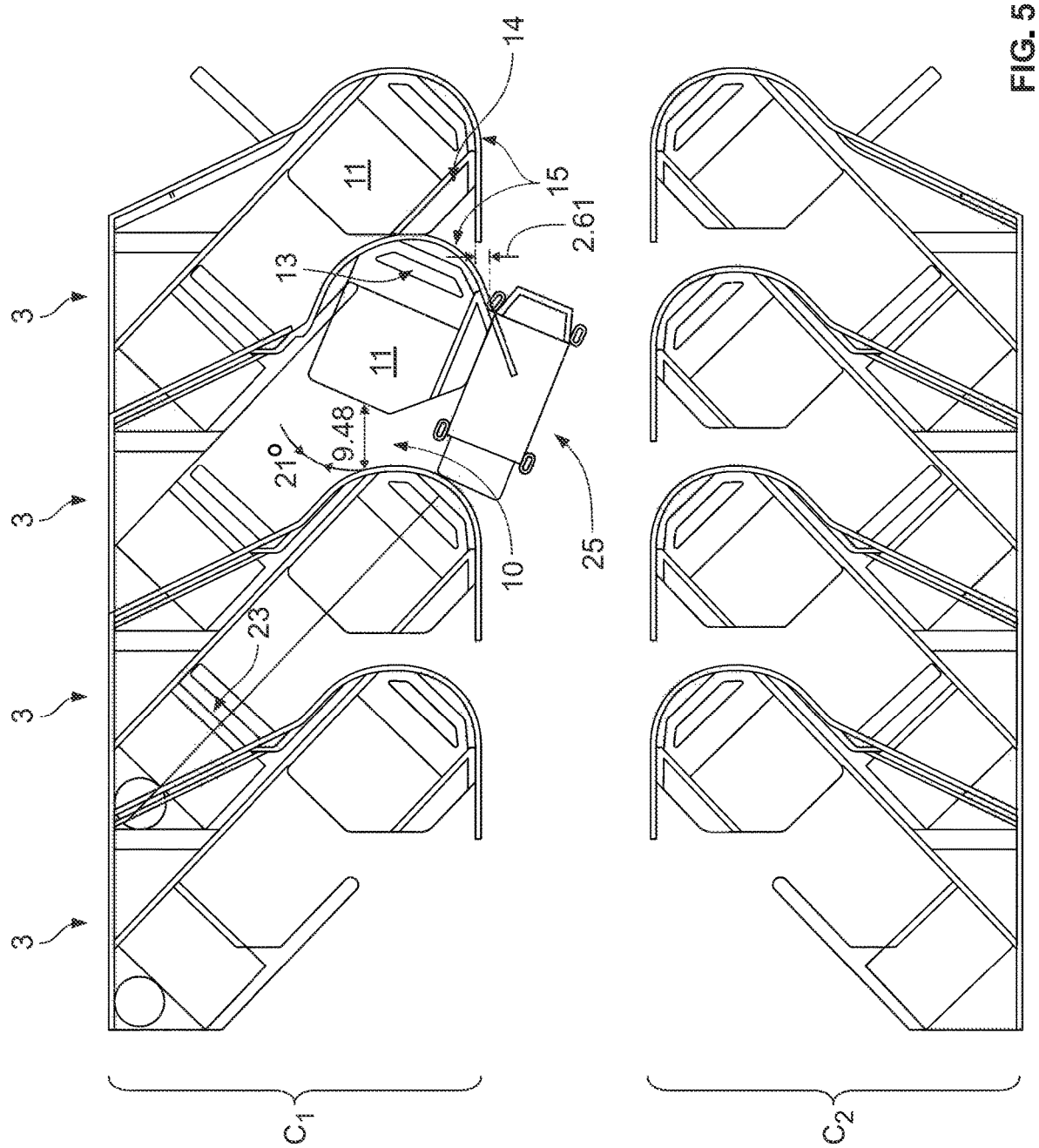
FIG. 5 is a plan view of a seating arrangement in FIG. 1 with one of the seat units in the PRM-access configuration.

Referring now to FIGS. 2 to 4, each seat unit 3 comprises a seat module 7 at one end (nearest the aisle 5), and a foot-receiving structure 9 at the opposite end (nearest the sidewall). The seat module 7 comprises a seat pan 11, a back rest 13 and a curved shroud 15. The shroud 15 is connected to a privacy screen 17 into which a pull-out IFE monitor 19 is housed.

FIGS. 2 and 3 show the seat units 3 in a seating configuration in which the seat module 7 is arranged to form a seat in which the passenger may sit. Each seat unit 3 is also configurable into a flat-bed configuration in which seating elements (comprising the seat pan 11 and seat back 13) are arranged to form a substantially coplanar surface that adjoins the ottoman surface 21 to create a flat-bed. The bed configuration is illustrated herein with reference to FIG. 4. Seat units that are convertible to flat-beds are known per se, and the precise manner in which the seating elements are rearranged to form the bed (e.g. the recline/convert mechanism) need not be described further in the context of the present invention.

FIG. 4 also illustrates a small sliding panel 12 within the seat module 7 which is slideable relative to the shroud 15. The sliding panel 12 can be deployed by the passenger in the seat for extra privacy from the aisle.

Each seat unit 3 has a longitudinal axis 23 orientated along the center of the seat pan 11 and seat back 13. The longitudinal axis 23 defines the orientation of the seat unit 5 which, in the first embodiment, is at an angle of 44 degrees to the longitudinal direction (L) (see FIG. 1). The seat units 3 face outwardly away from the aisle 5. Such an arrangement is typically referred to as an outwardly facing herringbone. In the first embodiment, the herringbone is at a relatively large (steep) angle and correspondingly the pitch between consecutive seat units 3 is relatively small. In the first embodiment the seat units have a 33 inch pitch.

Referring to FIGS. 2 and 3, it can be seen that the aisle 5 has a width of 22 inches, whereas there is a minimum width between each seat unit 3 of 8 inches (where the seat pan 11 and the shroud 15 of the neighboring seat unit are closest). This relatively small 8 inch gap defines a pinch point in the access opening 10 of the seat unit 3. In the first embodiment, the relatively small nature of this opening makes it unduly challenging for a PRM to access the seat unit.

In the first embodiment of the invention, the seat module 7 of one of the seat units 3 (highlighted in FIG. 5) is moveable such that the seat unit 3 adopts a PRM-access configuration in which this access opening is widened, and in which the seat pan 11 presents a more accessible surface onto which the PRM may maneuver. Reference to FIGS. 5 to 11 will now be made in order to illustrate this feature:

The seat module 7 is fixedly mounted on a plinth 27 (visible in FIGS. 6 to 11) that is rotatably mounted in the cabin 1 and flush with the cabin floor. The seat module 7 may be rotated by 23 degrees towards the aisle, to a position in which the shroud 15 abuts the armrest 14 of the neighboring (aftward) seat unit 3. In this position, the minimum width of the access opening 10 has widened to 9.48 inches.

To access the seat unit 3, a PRM moves along the aisle 5 (shown using a wheelchair 25 in FIGS. 6 to 10) to a position next to the seat unit being accessed. The armrest 14 of the seat module 3 is first lowered from a raised position (for supporting a seated passenger's arm) to a lowered position (as illustrated) in which the armrest 14 is flush with the seat pan 11 to both prevent the armrest 14 blocking the passenger from the seat pan 11, and also to provide a transfer surface onto the seat pan 11.

Figure 9:
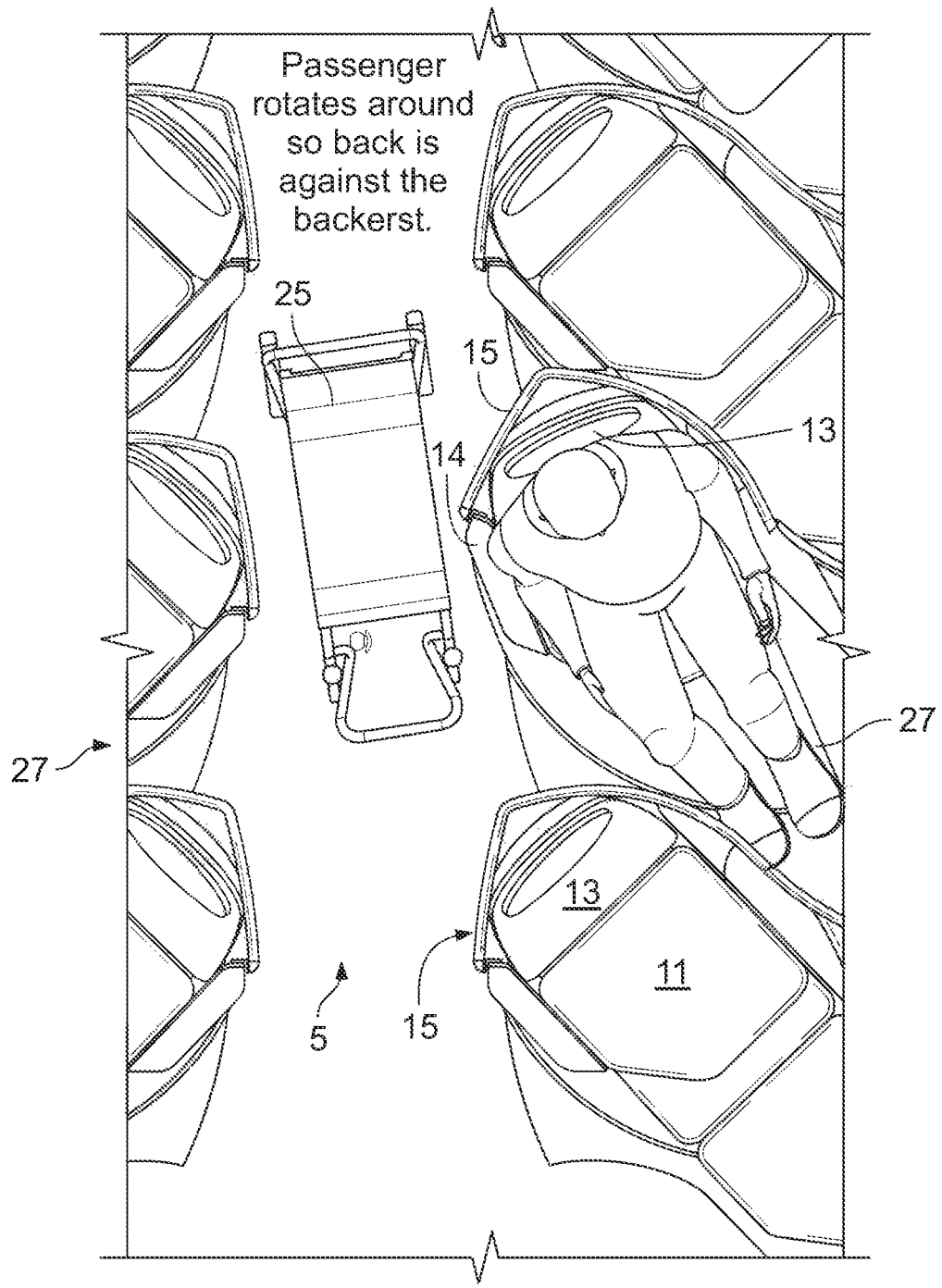

Next, the plinth 27 is rotated counter-clockwise such that the seat module 5 moves aft (illustrated in FIG. 9 with a thick curved arrow). This has two effects: firstly, the opening 10 between the seat pan 11 and the neighboring shroud 15 is widened; secondly the seat pan 11 is more closely orientated to the wheelchair 25 in the aisle thereby facilitating ease of movement onto the seat pan from the wheelchair 25.

In this position (illustrated in FIGS. 6-9), when the seat module 7 has been rotated aft, the seat unit 3 is in the PRM-access configuration. A flexible connection between the shroud 15 and the screen 17 allows this movement without an unsightly gap being created between these two structures.

Figure 7:
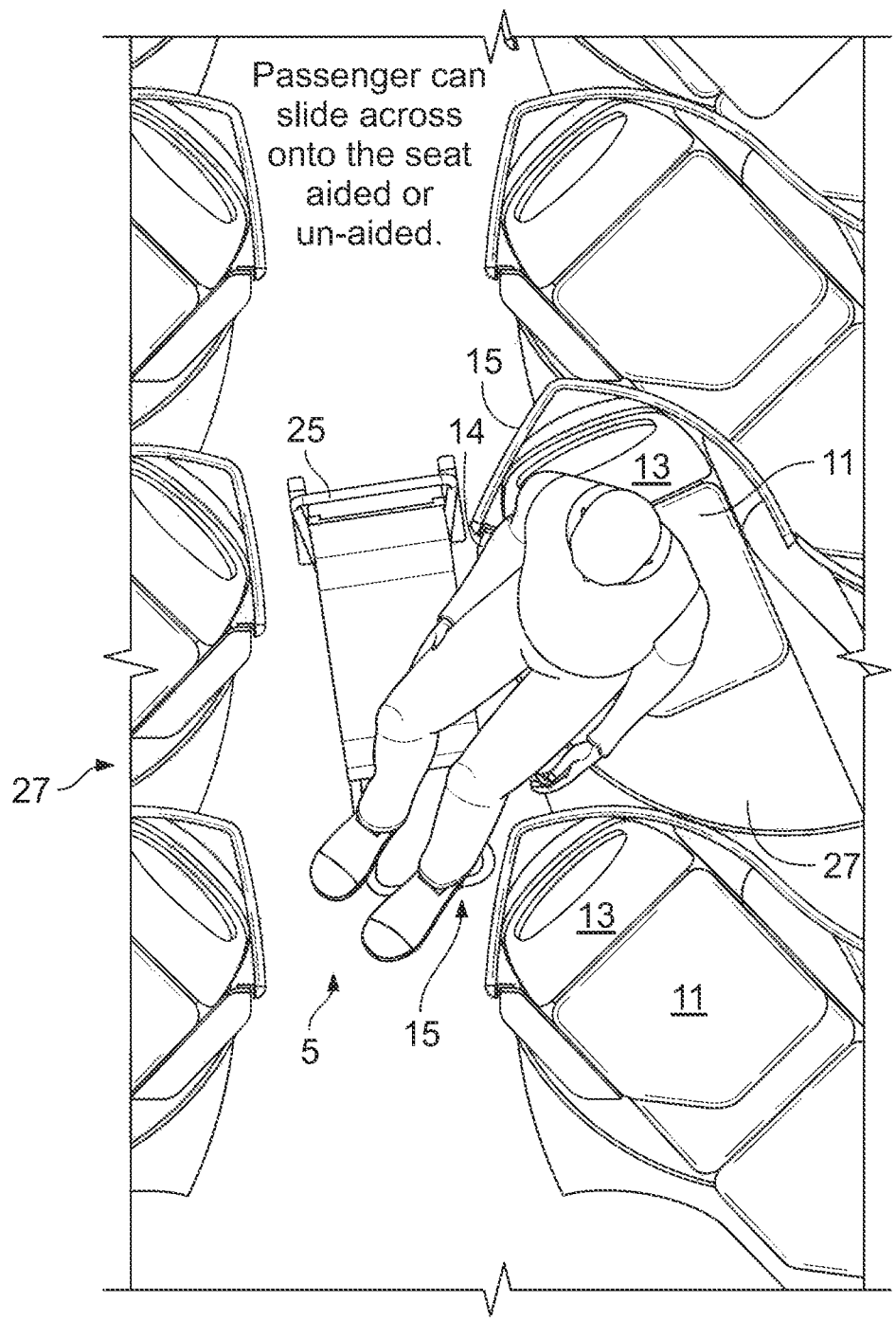
Figure 8:
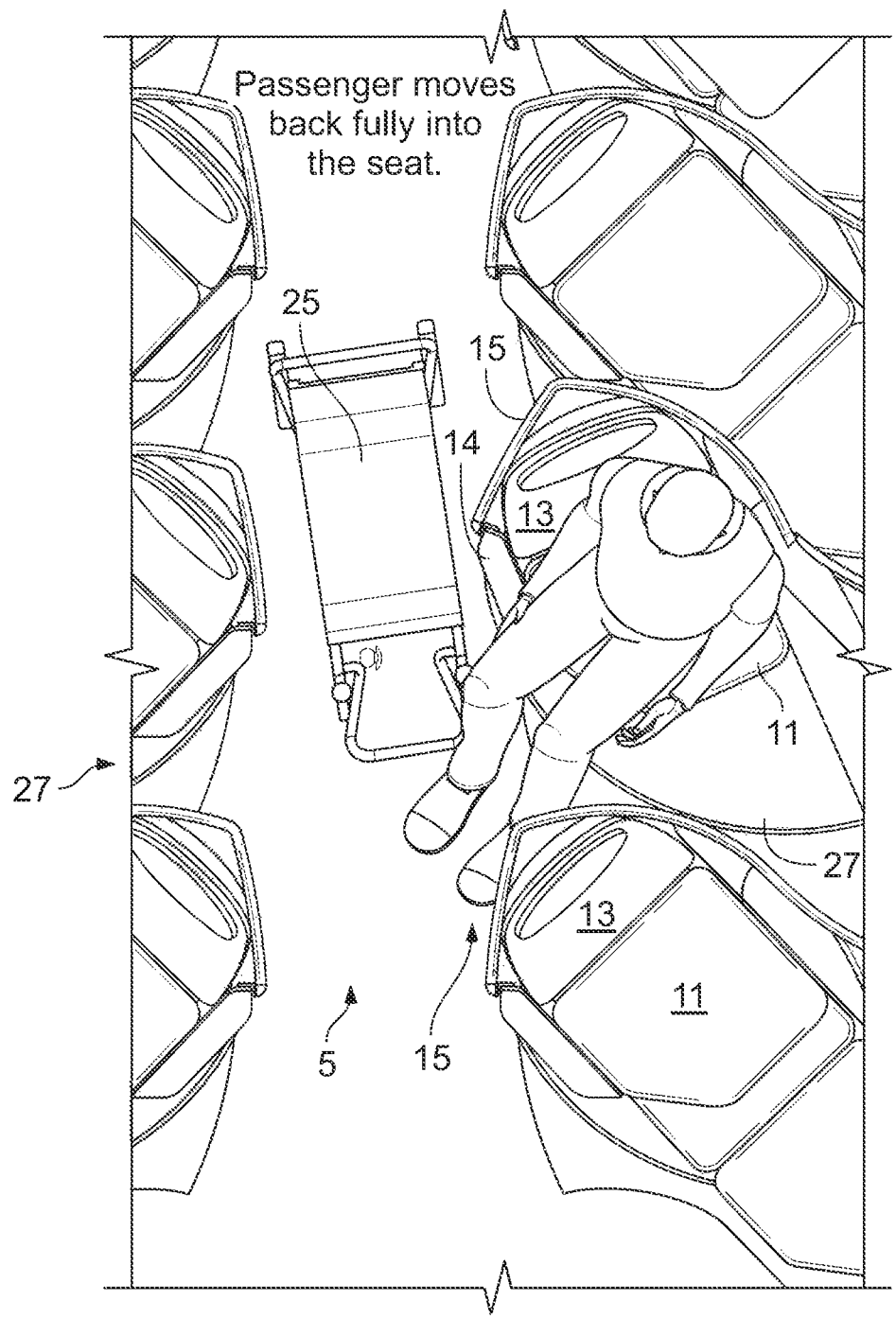

To access the seat unit 3, the PRM slides across the armrest 14 and onto the seat pan 11 (see FIGS. 7 and 8). Due to the orientation presented by the seat module 7, the PRM may be able to perform this maneuver unaided.

Once the PRM is on the seat, the PRM may adopt a seating position (see FIG. 9).

Figure 10:
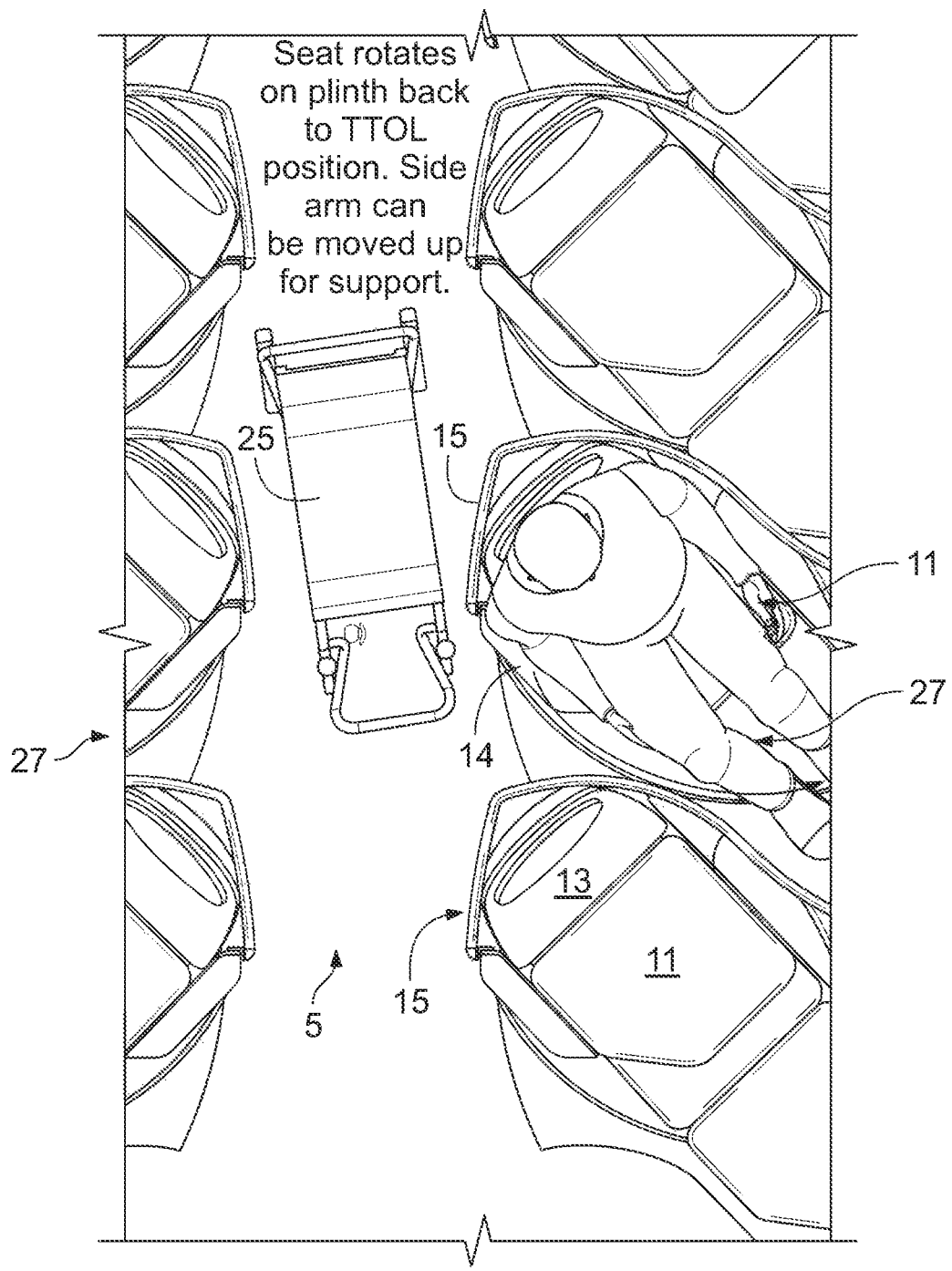

As shown in FIG. 10, the seat module 7 is then rotated back to the able-bodied access configuration, thereby bringing the seat module 7 into parallel orientation to the seat modules of the neighboring seat units 3. The armrest 14 can also then be raised back to the raised position.

Figure 11:
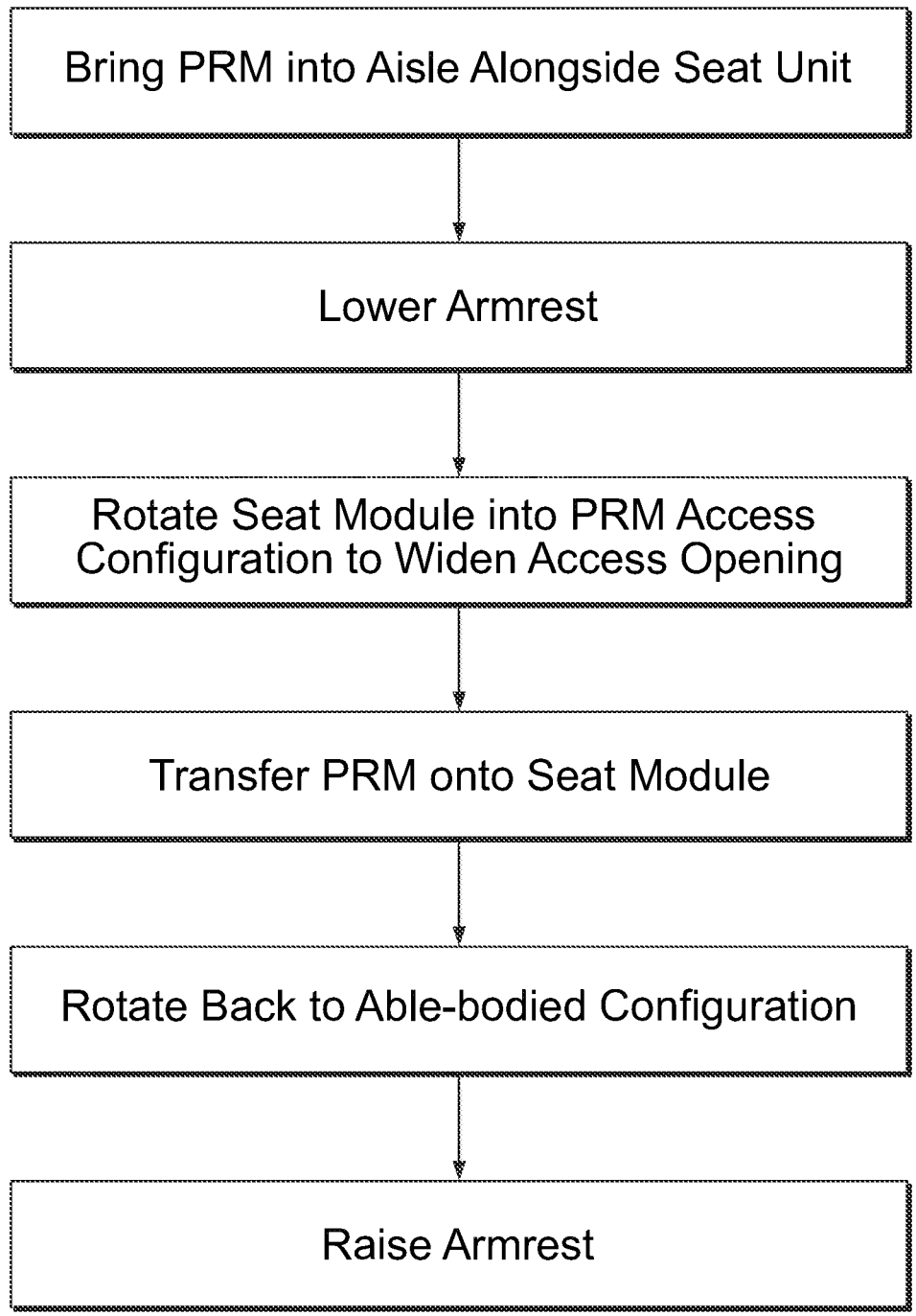
FIG. 11 is a flow-chart illustrating the method used to provide PRM access to the seat unit.

The above-mentioned steps are illustrated in the flowchart of FIG. 11. Should the passenger wish to exit the seat unit 3, the process can, of course, be repeated in reverse, as required, for the necessary egress into the aisle 5.

Other embodiments are also possible, which also widen the access opening via a movement of the seat module 7. These embodiments are illustrated in FIGS. 12 to 15. With reference to these other embodiments, common reference numerals are used but with the increment of 100, 200 etc. depending on the embodiment. In the interests of clarity, not all reference numerals are shown in the Figures for all the seat units.

Figure 12:
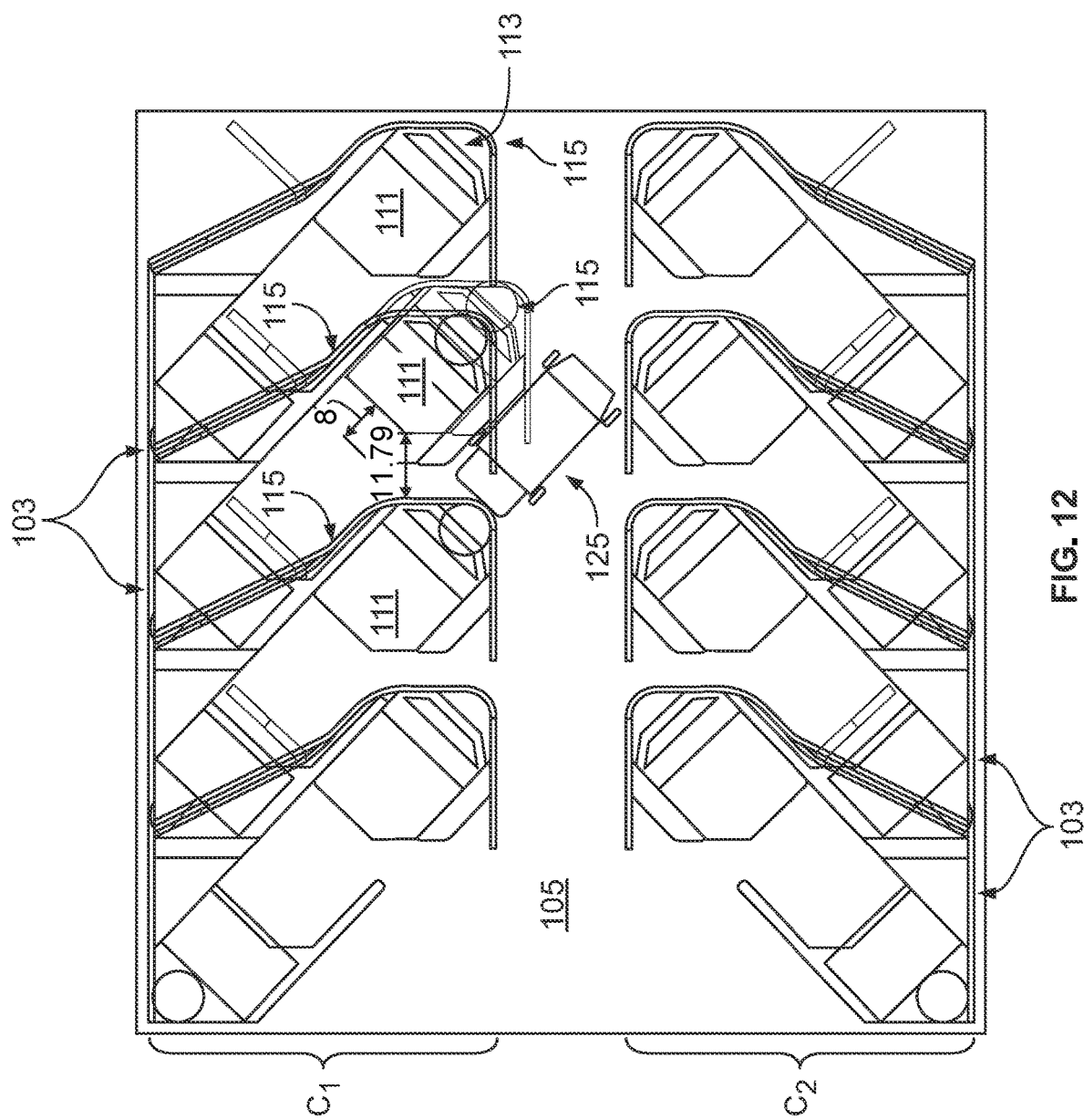
FIG. 12 is a plan view of a seating arrangement in a second embodiment of the invention with one of the seat units in the PRM-access configuration.

In the embodiment of FIG. 12 the seat module 105 is translatable on a track (not shown) rearwardly along the axis 23 of the seat unit 103. When the seat module 105 is moved rearwardly by 8 inches, the opening 110 widens to 11.79 inches and a large proportion of the seat pan 111 is able to adjoin the wheelchair 125 to facilitate easy access.

Figure 13:
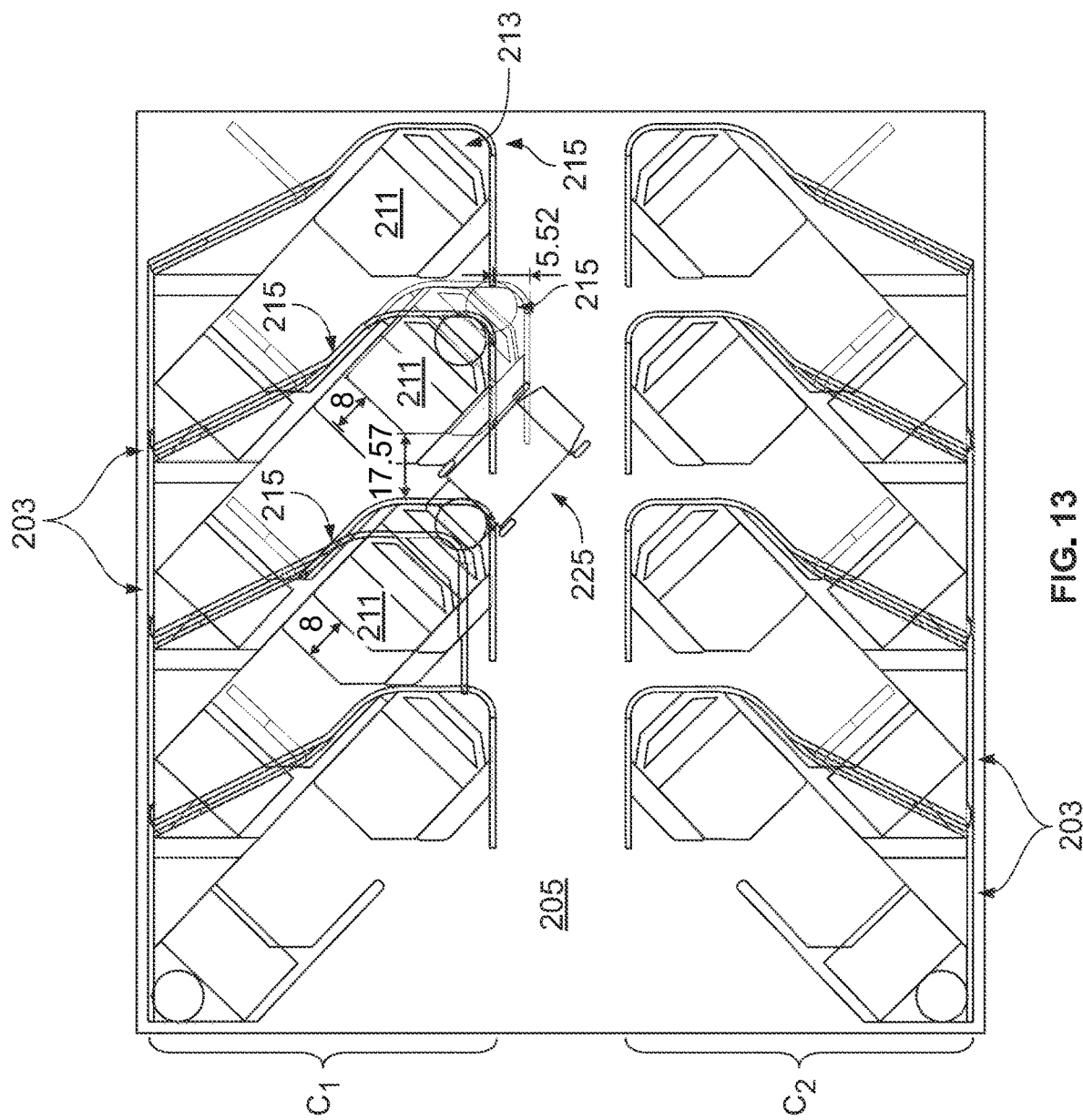
FIG. 13 is a plan view of a seating arrangement in a third embodiment of the invention with a seat unit and neighboring seat unit in PRM-access configurations.

In the embodiment of FIG. 13 the seat module 205 of the seat being accessed is translatable in the manner of FIG. 12. However, the seat module 205 on the adjacent seat unit 203 is also translatable, and is translatable in a direction towards the front of the seat unit 203. This dual movement in opposing direction of adjacent seat modules 205 enables the opening 210 to be widened to 17.57 inches and the wheelchair 225 may be completely aligned to the seat pan 211 of the seat unit 203 that is being accessed.

Figure 14:
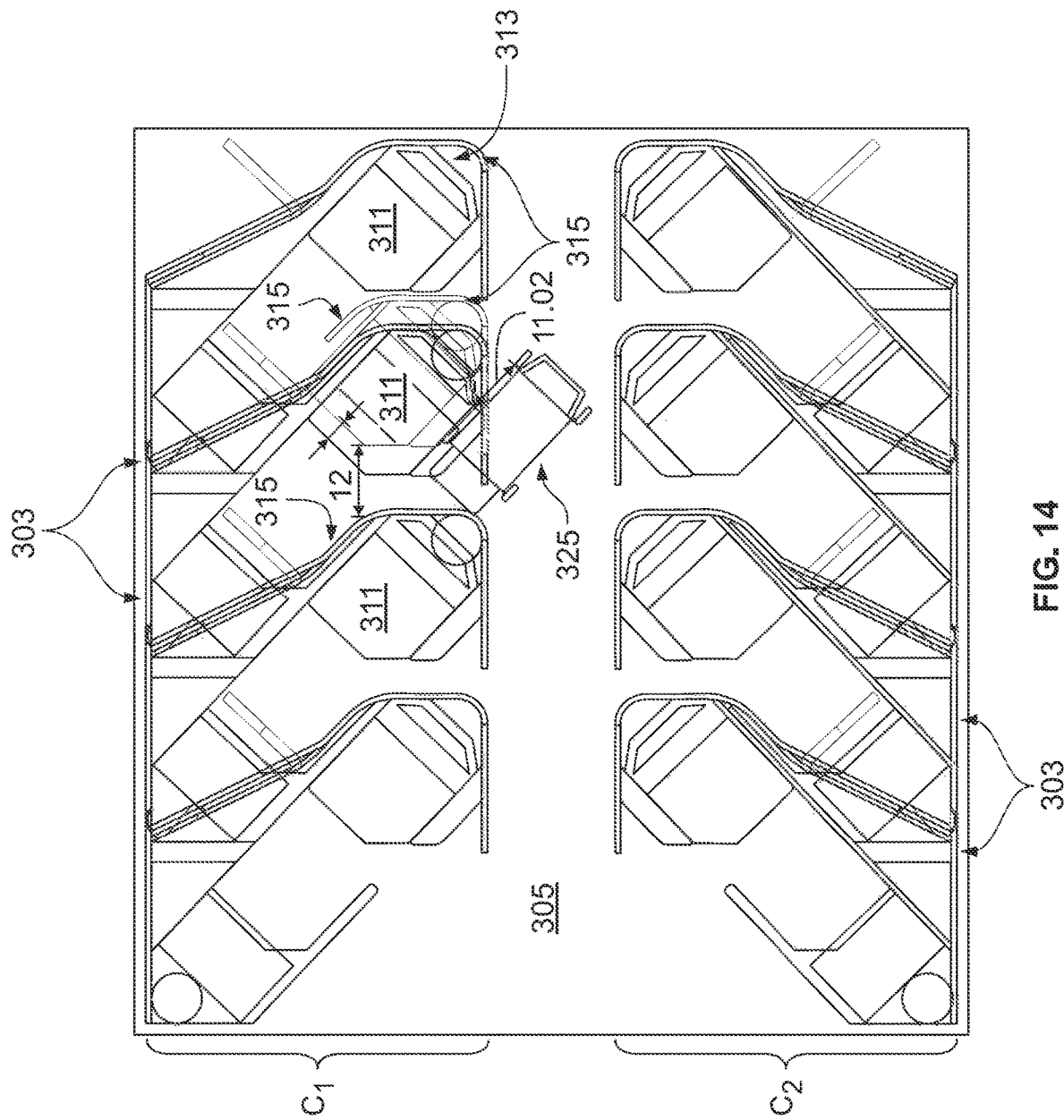
FIG. 14 is a plan view of a seating arrangement in a fourth embodiment of the invention with one of the seat units in the PRM-access configuration.

In the embodiment of FIG. 14 the seat module 305 is translatable on a track (not shown) in a direction parallel to the axis of the aircraft cabin (i.e. the longitudinal direction L). When the seat module 305 is moved rearwardly, the opening 310 may be widened to 12 inches.

Figure 15:
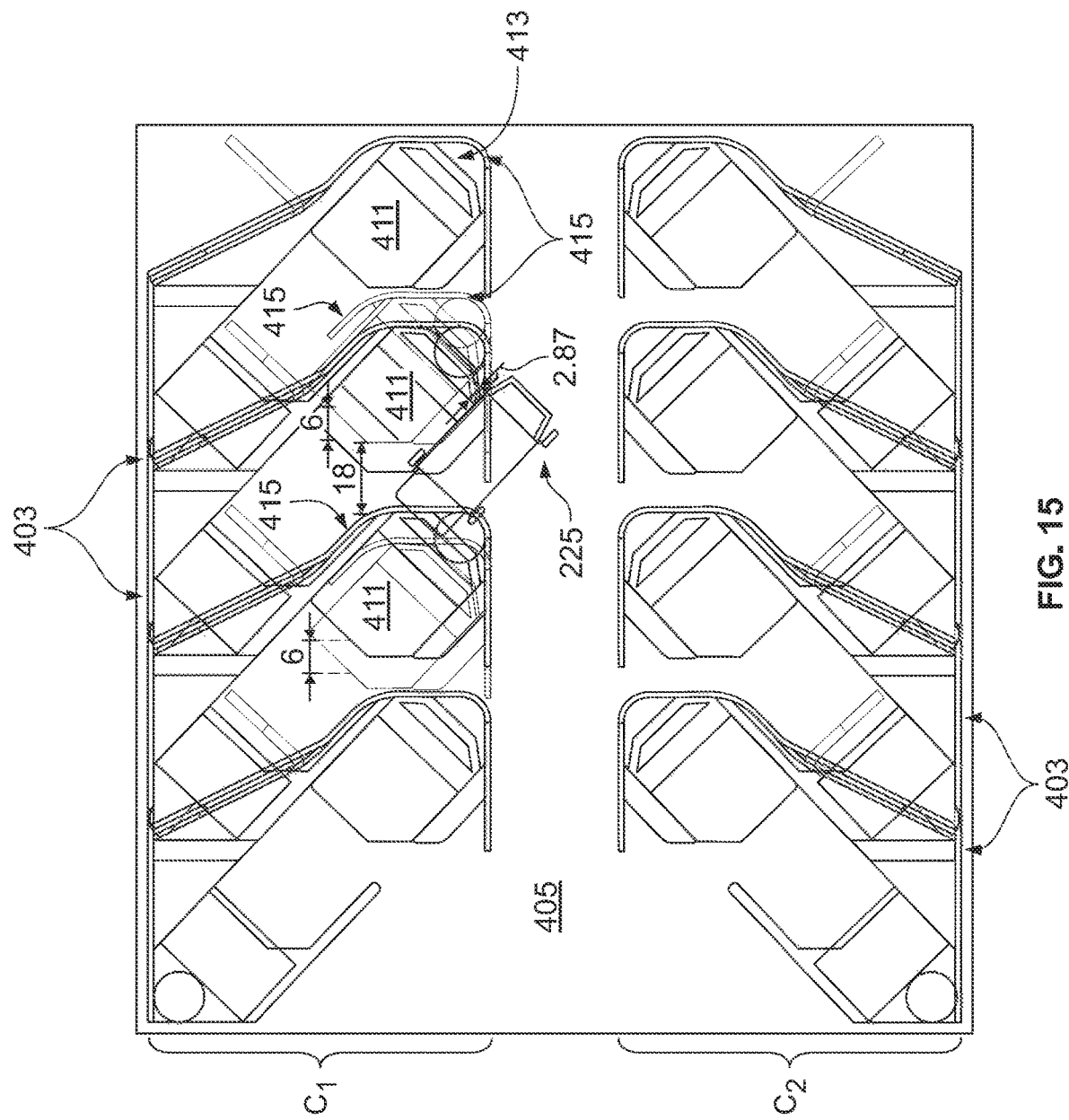
FIG. 15 is a plan view of a seating arrangement in a fifth embodiment of the invention with a seat unit and neighboring seat unit in PRM-access configurations.

In the embodiment of FIG. 15 the seat module 405 of the seat being accessed is translatable in the manner of FIG. 14. However, the seat module 405 on the adjacent seat unit 403 is also translatable, and is translatable in a direction towards the front of the aircraft cabin. This dual movement in opposing direction of adjacent seat modules 405 enables the opening 410 to be widened to 18 inches and the wheelchair 425 may be largely aligned to the seat pan 411 of the seat unit 403 being accessed.

Figure 16:
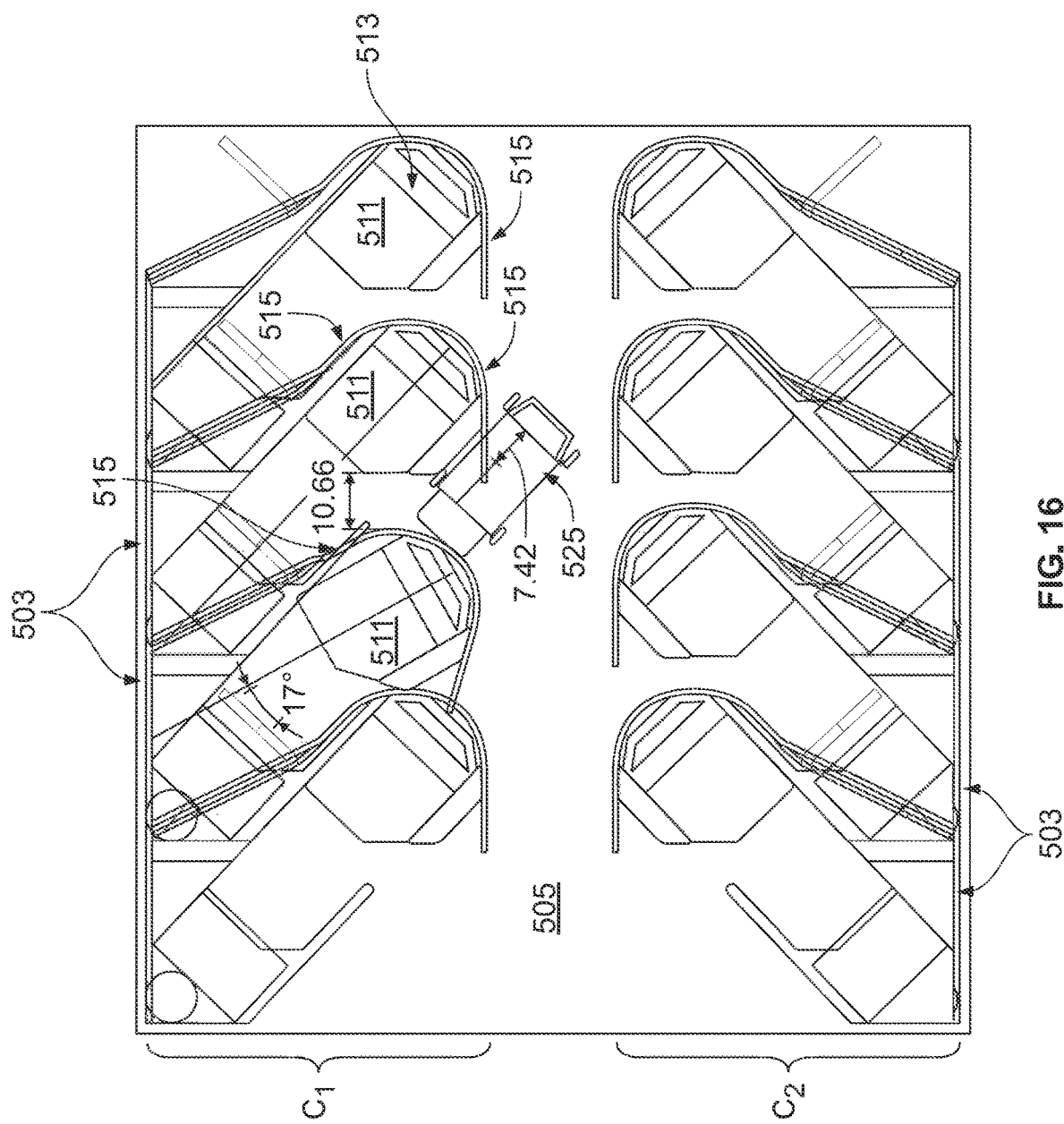
FIG. 16 is a plan view of a seating arrangement in a sixth embodiment of the invention with one of the seat units in the PRM-access configuration.

A further embodiment is shown in FIG. 16. This arrangement is similar to the first embodiment except that the neighboring seat unit 503 to the seat unit 503 actually being accessed, is the one in which the seat module 507 is moved to adopt a PRM-access configuration. Furthermore, the movement is a rotation in the opposing direction (clockwise) and towards the front of the cabin. This moves the shroud 515 of the seat module 505 forward and widens the opening to 10.66 inches, and a large proportion of the seat pan 511 is able to adjoin the wheelchair 525 to facilitate easy access.

In the above-mentioned embodiments, it may be that only a selection (but preferably at least 50%) of the multiplicity of seat units are configurable to a PRM-access configuration. For example, alternate seat units in each column may be configurable to the PRM-access configuration. In other embodiments (not shown) all of the seat units may be substantially identical and configurable to a PRM-access configuration. Such an arrangement is attractive as it may enable free choice of seat for PRM passengers, and may simplify construction of the seat units because all of them are substantially identical.

Figure 17:
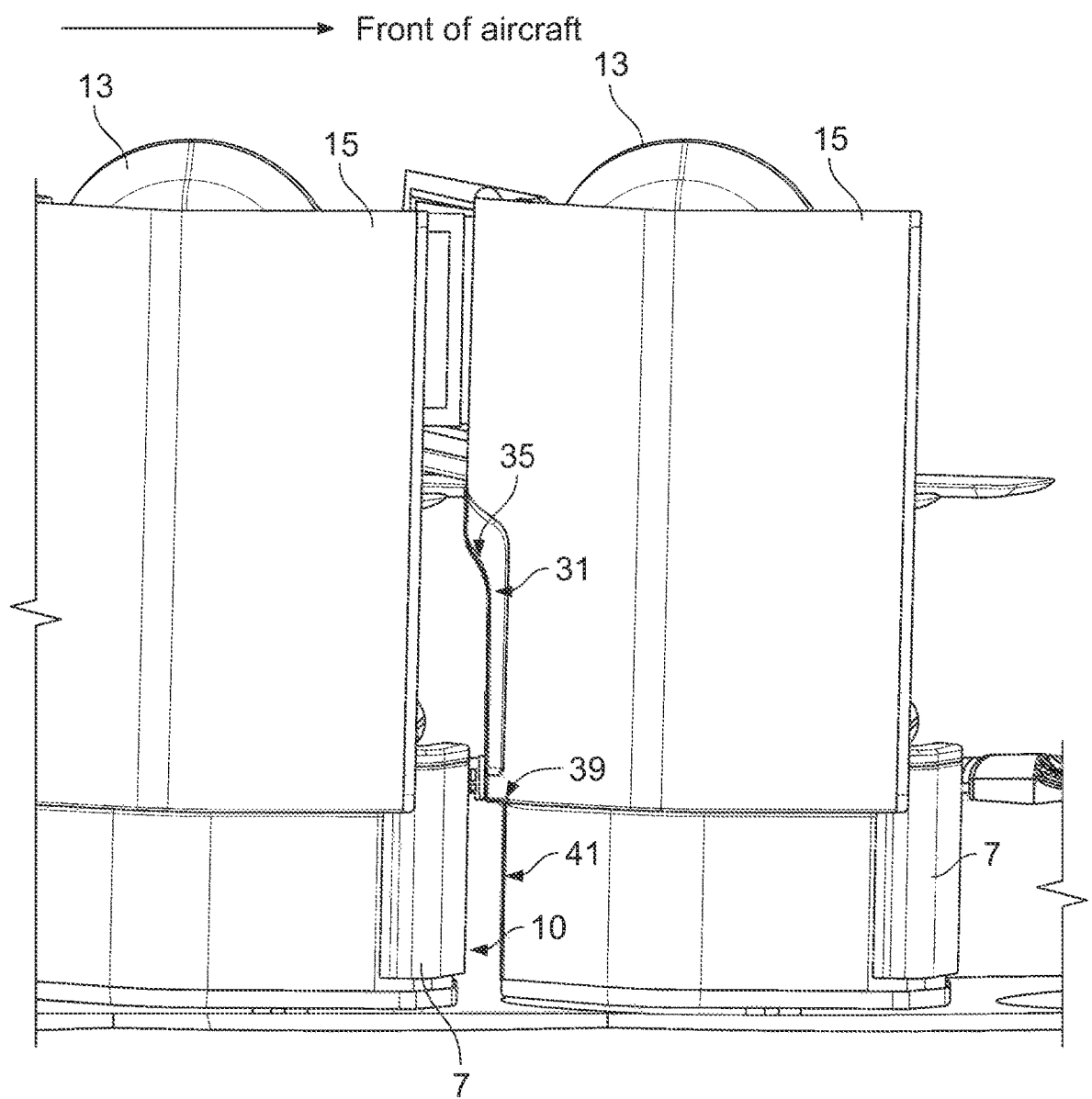
FIG. 17 is an aisle-view of two seat units according to the first embodiment of the invention.

Embodiments of the invention also exhibit other new and surprisingly beneficial features. Referring back to the first embodiment of the invention, FIG. 17 is an aisle-view of two of the seat units 3 in that embodiment.

From the aisle 5, the shrouds 15 largely shield the interior of the seat units from view. However, part of the access opening 10 can be seen, including the pinch point between the seat pan 11 and the adjacent shroud 15 (that narrow pinch point being visible obliquely from the aisle due to the acute angle of the seat units 3).

A furniture side wall 31 extends between the cabin floor and the base of the shroud 15. The outer edge of this furniture side wall 31 is shown in bold outline for clarity.

Figure 6:
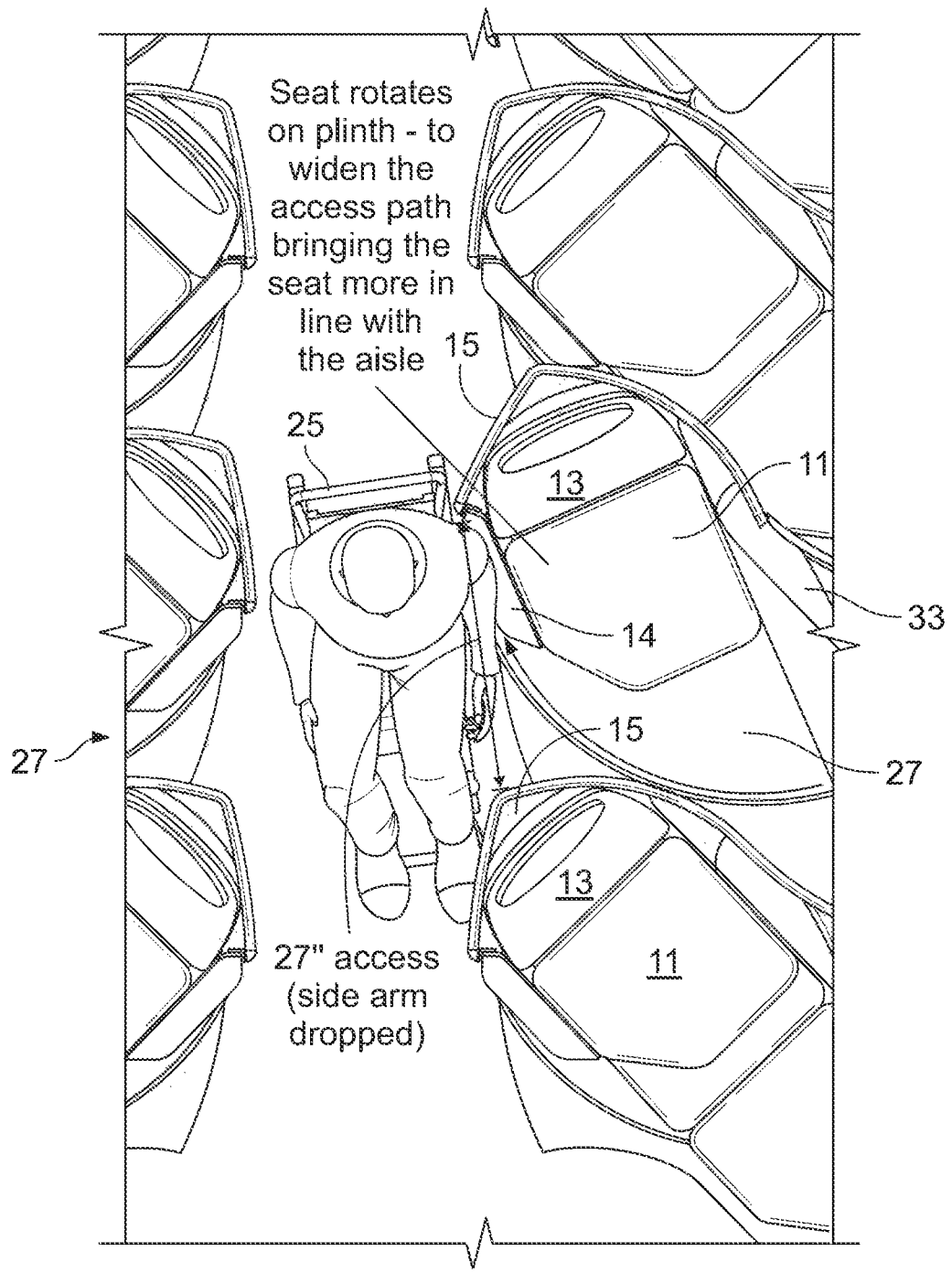
FIGS. 6-10 are views illustrating sequential steps in transferring a PRM into the seat unit of FIG. 5.

At its upper end, the furniture side wall 31 supports a fixed armrest 33 of the neighboring seat unit 3 (see FIGS. 2 and 6). The furniture side wall 31 transitions via a first inflection 35 into a leg-receiving region that is beneath the fixed armrest 33. The armrest 33 overhangs the leg-receiving region 37 such that space is shared between adjacent seat units at different heights, thereby enabling the low-pitch layout.

The furniture side wall 31 also transitions via a second inflection 39, below the leg-receiving region, into a feet-access recess 41. The leg-receiving region 37 overhangs the feet-access recess 41, resulting is a 'stepped' contour in the furniture side wall 31.

Figure 18:
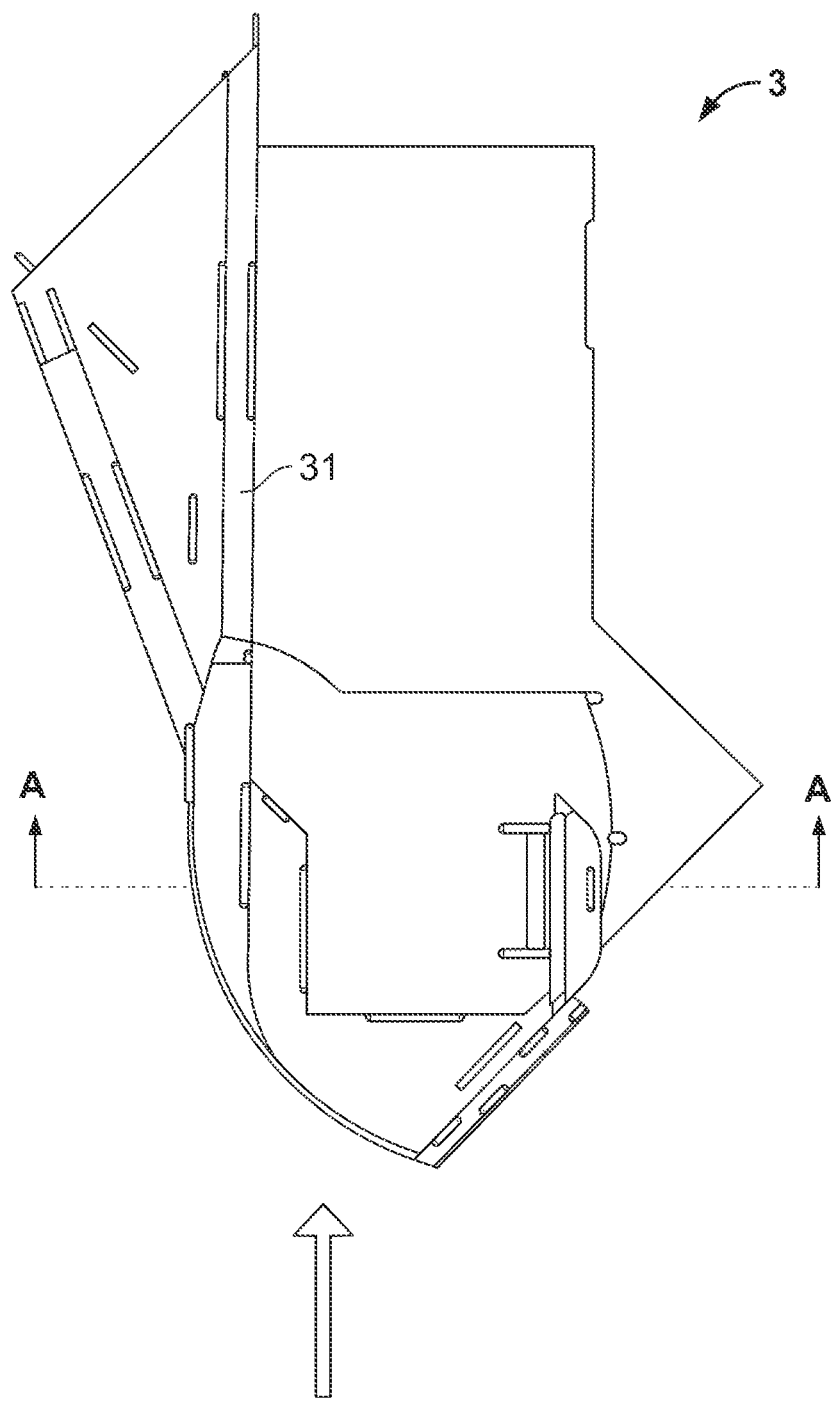
FIG. 18 is a schematic plan view of the substructure of one of the seat units in FIG. 17.
Figure 19:
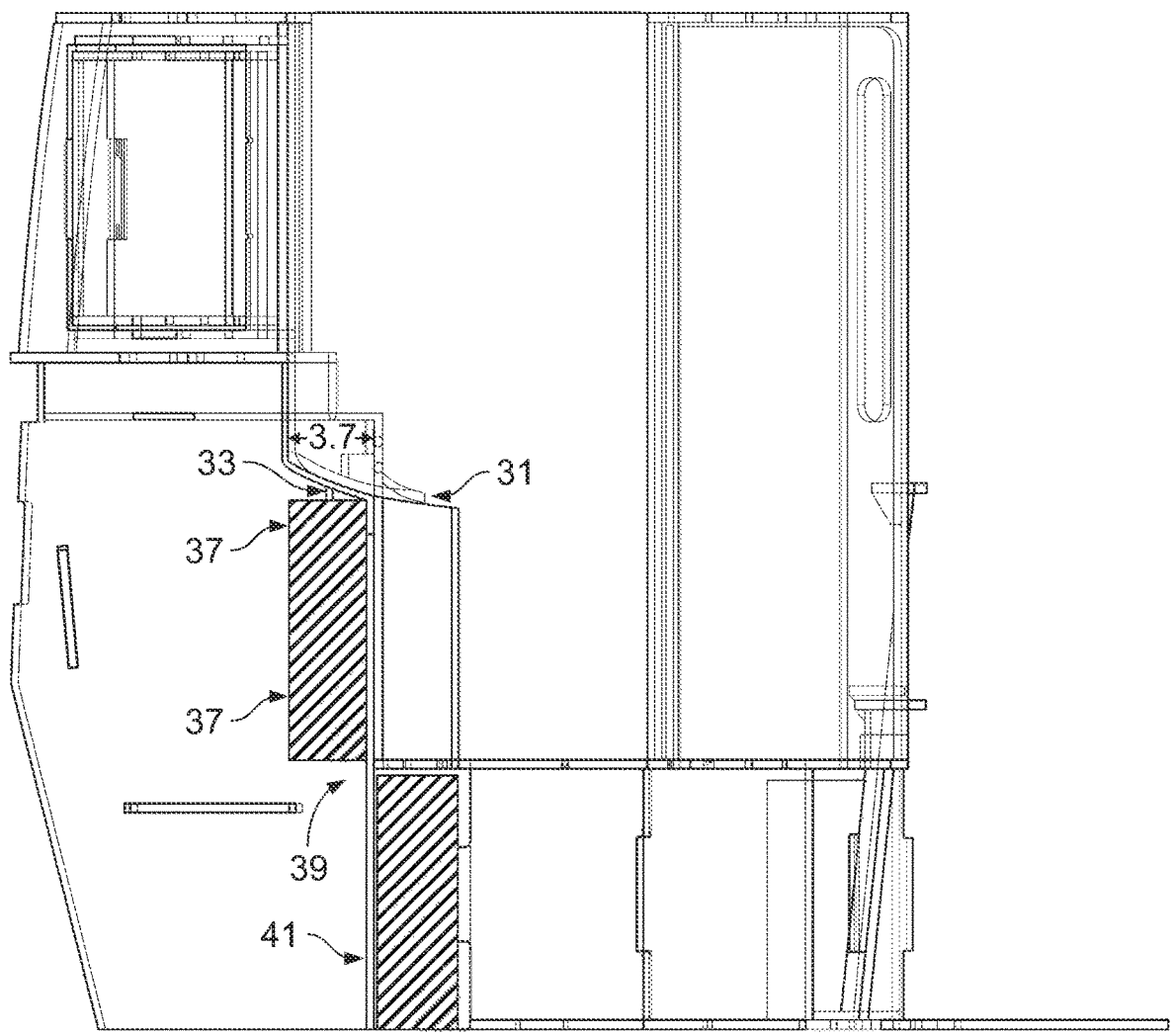
FIG. 19 is a view along section A-A of FIG. 18

These features are also illustrated in FIGS. 18 and 19, which illustrate the double-inflected furniture side wall 31 and the associated regions for the passenger's legs and feet.

The above-mentioned arrangement has a number of benefits, especially in terms of access the seat unit. Firstly, the leg-receiving region 37 enables an able-bodied passenger to readily move their upper leg/waist region into the seat unit 3 when passing through the opening 10. Secondly, this same region also accommodates and allows passage of a PRM's knees when they are accessing the seat unit in the PRM-access configuration. This is best illustrated when viewing how the PRM moves in FIGS. 8 and 9. Furthermore, the provision of the feet-access recess 41 accommodates an able-bodied passenger's feet as they pass through the opening 10 (which may have to be performed ins a slightly sideways movement), and also accommodates a PRM's feet as they rotate of the seat pan 11 into the seating position. This is best illustrated when viewing how the PRM moves in FIGS. 8 and 9 (not the PRM's feet passing under the arm-rest of the neighboring seat unit 3).

The above-mentioned features in the furniture side wall may, in some embodiments, be provided without the moveable seat module. In preferred embodiments, such as the first embodiment, the feature is provided in conjunction with the moveable seat module. As most clearly illustrated in FIGS. 6 and 7, it can be seen that the shroud 15 separates from the underlying furniture side wall 31 as the seat module is moved in the PRM-access configuration, thereby allowing but the conversion to the PRM-access configuration and the ease of movement for able-bodied and PRM passengers.

Whilst the present invention has been described and illustrated with reference to particular embodiments, it will be appreciated by those of ordinary skill in the art that the invention lends itself to many different variations not specifically illustrated herein. By way of example only, certain possible variations will now be described:

Whilst embodiments of the present invention tend to be most applicable to high angle/low pitch arrangements, the exact pitch, angle and width values need not necessarily be as described with reference to the above-mentioned embodiments. A high angle may be any angle over 41 degrees. A low pitch may be any pitch lower than 36 inches.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A passenger seating arrangement in an aircraft cabin, the passenger seating arrangement comprising:
a column of seat units located adjacent an aisle, the column of seat units and the aisle both extending in a longitudinal direction parallel to the longitudinal axis of the aircraft cabin, wherein the column comprises a multiplicity of seat units, arranged consecutively along the longitudinal direction,
wherein each seat unit comprises:
a seat module at one end of the seat unit; and
a foot-receiving structure at the other end of the seat unit, the seat module comprising:
a seat pan;
a seat back; and
a shroud enclosing the rear of the seat back,
wherein each seat unit is configurable between a seating configuration and a flat-bed configuration,
wherein each seat unit is orientated at an acute angle to the longitudinal direction and faces outwardly away from the aisle,
wherein the spacing between a seat pan of a seat unit in the column and the shroud of a neighboring seat unit in the column defines an access opening for accessing that seat unit from the aisle,
wherein the access opening has a first width for access by an able-bodied passenger,
wherein the seat unit, or the neighboring seat unit, is configurable into a person of reduced mobility (PRM)-access configuration in which the seat module is moved to temporarily widen the access opening from the first width to a second width, greater than the first width, for enabling a disabled passenger to access the seat unit,
wherein each seat unit comprises a longitudinal axis orientated at the acute angle to the longitudinal direction, and wherein in the PRM-access configuration the seat module is moved in a direction along the longitudinal axis of the seat unit, and
wherein in the PRM access configuration the seat module is moved in a direction along the longitudinal axis of the seat unit and into the aisle.

2. A passenger seating, arrangement in an aircraft cabin, the passenger seating arrangement comprising: a column of seat units located adjacent an aisle, the column of seat units and the aisle both extending in a longitudinal direction parallel to the longitudinal axis of the aircraft cabin,
wherein the column comprises a multiplicity of seat units, arranged consecutively along the longitudinal direction,
wherein each seat unit comprises:
a seat module at one end of the seat unit; and
a foot-receiving structure at the other end of the seat unit, the seat module comprising:
a seat pan;
a seat back; and
a shroud enclosing the rear of the seat back,
wherein each seat unit is configurable between a seating configuration and a flat-bed configuration,
wherein each seat unit is orientated at an acute angle to the longitudinal direction and faces outwardly away from the aisle,
wherein the spacing between a seat pan of a seat unit in the column and the shroud of a neighboring seat unit in the column defines an access opening for accessing that seat unit from the aisle,
wherein the access opening has a first width for access by an able-bodied passenger,
wherein the seat unit, or the neighboring seat unit, is configurable into a person of reduced mobility (PRM)-access configuration in which the seat module is moved to temporarily widen the access opening from the first width to a second width, greater than the first width, for enabling a disabled passenger to access the seat unit,
wherein each seat unit comprises: a longitudinal axis orientated at the acute angle to the longitudinal direction, and wherein in the PRM-access configuration the seat module is moved in a direction along the longitudinal axis of the seat unit,
wherein the neighboring seat unit is configurable into the PRM-access configuration, and
wherein the seat module is moved in a direction along the longitudinal axis of the seat unit and away from the aisle.

3. A passenger seating arrangement in an aircraft cabin, the passenger seating arrangement comprising: a column of seat units located adjacent an aisle, the column of seat units and the aisle both extending in a longitudinal direction parallel to the longitudinal axis of the aircraft cabin,
wherein the column comprises a multiplicity of seat units, arranged consecutively along the longitudinal direction,
wherein each seat unit comprises:
a seat module at one end of the seat unit; and
a foot-receiving structure at the other end of the seat unit, the seat module comprising:
a seat pan; a seat back; and
a shroud enclosing the rear of the seat back,
wherein each seat unit is configurable between a seating configuration and a flat-bed configuration,
wherein each seat unit is orientated at an acute angle to the longitudinal direction and faces outwardly away from the aisle,
wherein the spacing between a seat pan of a seat unit in the column and the shroud of a neighboring seat unit in the column defines an access opening for accessing that seat unit from the aisle,
wherein the access opening has a first width for access by an able-bodied passenger,
wherein the seat unit, or the neighboring seat unit, is configurable into a person of reduced mobility (PRM)-access configuration in which the seat module is moved to temporarily widen the access opening from the first width to a second width, greater than the first width, for enabling a disabled passenger to access the seat unit,
wherein each seat unit comprises: a longitudinal axis orientated at the acute angle to the longitudinal direction,
wherein in the PRM-access configuration the seat module is moved in a direction along the longitudinal axis of the seat unit, and
wherein the seat unit, and the neighboring seat unit, are configurable into a PRM-access configuration, in which the seat module of the seat unit is moved in a direction along the longitudinal axis of the seat unit and into the aisle, and the seat module of the neighboring seat unit is moved in a direction along the longitudinal axis of the seat unit and away from the aisle.

4. A passenger seating, arrangement in an aircraft cabin, the passenger seating arrangement comprising: a column of seat units located adjacent an aisle, the column of seat units and the aisle both extending in a longitudinal direction parallel to the longitudinal axis of the aircraft cabin, and wherein the column comprises a multiplicity of seat units, arranged consecutively along the longitudinal direction, wherein each seat unit comprises:
- a seat module at one end of the seat unit; and
- a foot-receiving structure at the other end of the seat unit, the seat module comprising:
  - a seat pan;
  - a seat back; and
  - a shroud enclosing the rear of the seat back, wherein each seat unit is configurable between a seating configuration and a flat-bed configuration, wherein each seat unit is orientated at an acute angle to the longitudinal direction and faces outwardly away from the aisle, wherein the spacing between a seat pan of a seat unit in the column and the shroud of a neighboring seat unit in the column defines an access opening for accessing that seat unit from the aisle, wherein the access opening has a first width for access by an able-bodied passenger, wherein the seat unit, or the neighboring seat unit, is configurable into a person of reduced mobility (PRM)-access configuration in which the seat module is moved to temporarily widen the access opening from the first width to a second width, greater than the first width, for enabling a disabled passenger to access the seat unit, wherein in the PRM-access configuration the seat module is moved in the longitudinal direction parallel to the longitudinal axis of the aircraft cabin, wherein the neighboring seat unit is configurable into the PRM-access configuration, and wherein the seat module is moved in the longitudinal direction towards the fore of the cabin.

5. A passenger seating arrangement in an aircraft cabin, the passenger seating arrangement comprising: a column of seat units located adjacent an aisle, the column of seat units and the aisle both extending in a longitudinal direction parallel to the longitudinal axis of the aircraft cabin, wherein the column comprises a multiplicity of seat units, arranged consecutively along the longitudinal direction, wherein each seat unit comprises:
- a seat module at one end of the seat unit; and
- a foot-receiving structure at the other end of the seat unit, the seat module comprising:
  - a seat pan;
  - a seat back; and
  - a shroud enclosing the rear of the seat back, wherein each seat unit is configurable between a seating configuration and a flat-bed configuration, wherein each seat unit is orientated at an acute angle to the longitudinal direction and faces outwardly away from the aisle, wherein the spacing between a seat pan of a seat unit in the column and the shroud of a neighboring seat unit in the column defines an access opening for accessing that seat unit from the aisle, wherein the access opening has a first width for access by an able-bodied passenger, wherein the seat unit, or the neighboring seat unit, is configurable into a person of reduced mobility (PRM)-access configuration in which the seat module is moved to temporarily widen the access opening from the first width to a second width, greater than the first width, for enabling a disabled passenger to access the seat unit, wherein in the PRM-access configuration the seat module is moved in the longitudinal direction parallel to the longitudinal axis of the aircraft cabin, and wherein the seat unit, and the neighboring seat unit, are configurable into the PRM-access configuration, in which the seat module of the seat unit is moved in the longitudinal direction towards the aft of the cabin, and the seat module of the neighboring seat unit is moved in the longitudinal direction towards the fore of the cabin.

6. A passenger seating arrangement in an aircraft cabin, the passenger seating arrangement comprising:
a column of seat units located adjacent an aisle, the column of seat units and the aisle both extending in a longitudinal direction parallel to the longitudinal axis of the aircraft cabin, wherein the column comprises a multiplicity of seat units, arranged consecutively along the longitudinal direction, wherein each seat unit comprises:
- a seat module at one end of the seat unit and a foot-receiving structure at the other end of the seat unit, the seat module comprising:
  - a seat pan;
  - a seat back, and
  - a shroud enclosing the rear of the seat back, wherein each seat unit is configurable between a seating configuration and a flat-bed configuration, wherein each seat unit is orientated at an acute angle to the longitudinal direction and faces outwardly away from the aisle, wherein the spacing between a seat pan of a seat unit in the column and the shroud of a neighboring seat unit in the column defines an access opening for accessing that seat unit from the aisle, wherein the access opening has a first width for access by an able-bodied passenger, wherein the seat unit, or the neighboring seat unit, is configurable into a person of reduced mobility (PRM)-access configuration in which the seat module is moved to temporarily widen the access opening from the first width to a second width, greater than the first width, for enabling a disabled passenger to access the seat unit, wherein each seat unit comprises: a privacy screen for shielding one seat unit from the neighboring seat unit, and wherein the shroud of each seat module adjoins an end of the privacy screen, and wherein the shroud is flexibly connected to the end of the privacy screen to allow relative movement between the shroud and the screen during movement to and from the PRM-access configuration.

7. A passenger seating arrangement in an aircraft cabin, the passenger seating arrangement comprising:
a column of seat units located adjacent an aisle, the column of seat units and the aisle both extending in a longitudinal direction parallel to the longitudinal axis of the aircraft cabin, wherein the column comprises a multiplicity of seat units, arranged consecutively along the longitudinal direction, wherein each seat unit comprises:
- a seat module at one end of the seat unit; and
- a foot-receiving structure at the other end of the seat unit, the seat module comprising:
  - a seat pan;
  - a seat back; and
  - a shroud enclosing the rear of the seat back, wherein each seat unit is configurable between a seating configuration and a flat-bed configuration,
wherein each seat unit is orientated at an acute angle to the longitudinal direction and faces outwardly away from the aisle,
wherein the spacing between a seat pan of a seat unit in the column and the shroud of a neighboring seat unit in the column defines an access opening for accessing that seat unit from the aisle,
wherein the access opening has a first width for access by an able-bodied passenger,
wherein the seat unit, or the neighboring seat unit, is configurable into a person of reduced mobility (PRM)-access configuration in which the seat module is moved to temporarily widen the access opening from the first width to a second width, greater than the first width, for enabling a disabled passenger to access the seat unit,
wherein each seat unit further comprises: a fixed armrest on the side of the seat unit furthest from the aisle, the armrest being arranged to overhang a leg-receiving region of the neighboring seat, on the side of the neighboring seat unit closest to the aisle, and
wherein the shroud of the seat module adjoins outer side of the fixed armrest, and when moved to the PRM-access configuration the shroud is separated from the fixed armrest.

8. A passenger seating arrangement in an aircraft cabin, the passenger seating arrangement comprising:
a column of seat units located adjacent an aisle, the column of seat units and the aisle both extending in a longitudinal direction parallel to the longitudinal axis of the aircraft cabin, wherein the column comprises a multiplicity of seat units, arranged consecutively along the longitudinal direction,
wherein each seat unit comprises:
a seat module at one end of the seat unit; and
a foot-receiving structure at the other end of the seat unit, the seat module comprising:
a seat pan, and
a seat back,
wherein each seat unit is configurable between a seating configuration and a flat-bed configuration,
wherein each seat unit is orientated at an acute angle to the longitudinal direction and faces outwardly away from the aisle,
wherein the spacing between a seat pan of a seat unit in the column and a shroud of a neighboring seat unit in the column defines an access opening for accessing that seat unit from the aisle
wherein the access opening has a first width for access by an able-bodied passenger;
wherein the seat module of the seat unit, or of the neighboring seat unit, is rotatable, via an axis of rotation, to configure the respective seat unit or neighboring seat unit into a person of reduced mobility (PRM)-access configuration, and
wherein the axis of rotation is offset from a center-line of the seat module such that in the PRM-access configuration the seat module is rotated to temporarily widen the access opening from the first width to a second width, greater than the first width, for enabling a disabled passenger to access the seat unit.

9. The passenger seating arrangement according to claim 8, wherein the privacy screen houses an in-flight entertainment monitor.

10. The passenger seating arrangement according to claim 8, wherein the acute angle to the longitudinal direction is between 41 and 48 degrees, and
wherein a pitch between consecutive seat units in the column is between 31 and 35 inches.

11. The passenger seating arrangement according to claim 8, wherein each seat unit comprises a fixed armrest on a side of the seat unit furthest from the aisle, the armrest being arranged to overhang a leg-receiving region of the neighboring seat, on the side of the neighboring seat unit closest to the aisle,
wherein each seat unit comprises:
the leg receiving region; and
a feet-access recess partly formed by the seat module and partly formed by fixed side furniture, and
wherein the fixed side furniture comprises a wall comprising:
a first inflection at a transition between the feet-access recess and the leg receiving region; and
a second inflection at the transition between the leg receiving region and the armrest of the neighboring seat unit.

12. The passenger seating arrangement according to claim 8, wherein the seat module is fixedly mounted on a plinth, and the plinth is rotatable about the axis of rotation.

13. The passenger seating arrangement according to claim 8, wherein in the PRM-access configuration the seat module is rotated in a direction to move the seat module towards the aft of the cabin.

14. The passenger seating arrangement according to claim 8, wherein the neighboring seat unit is configurable into the PRM-access configuration, and wherein the seat module is rotated in a direction to move the seat module towards the fore of the cabin.

15. The passenger seating arrangement according to claim 8, wherein the seat unit and the neighboring seat unit are configurable into the PRM-access configuration, in which the seat module of the seat unit is rotated in a direction to move the seat module towards the aft of the cabin, and the seat module of the neighboring seat unit is rotated in a direction to move the seat module towards the fore of the cabin.

16. The passenger seating arrangement according to claim 8, wherein the seat module comprises a shroud enclosing the rear of the seat back, and
wherein each seat unit comprises: a privacy screen for shielding one seat unit from the neighboring seat unit, and wherein the shroud of each seat module adjoins an end of the privacy screen.

17. The passenger seating arrangement according to claim 16, wherein the shroud is flexibly connected to the end of the privacy screen to allow relative movement between the shroud and the screen during movement to and from the PRM-access configuration.

18. The passenger seating arrangement according to claim 8, wherein each seat unit further comprises a fixed armrest on the side of the seat unit furthest from the aisle, the armrest being arranged to overhang a leg-receiving region of the neighboring seat, on the side of the neighboring seat unit closest to the aisle.

19. The passenger seating arrangement according to claim 18, wherein the seat module comprises a shroud enclosing the rear of the seat back,
and wherein the shroud of the seat module adjoins an outer side of the fixed armrest, and when moved to the PRM-access configuration the shroud is separated from the fixed armrest.

20. The passenger seating arrangement according to claim 8, wherein the seat module comprises an armrest, and
wherein the armrest is moveable from a raised position for supporting a passenger's arms, to an access position for facilitating access to the seat unit.

21. The passenger seating arrangement according to claim 20, wherein in the access position, the armrest is lowered such that it is substantially flush with the seat pan of the seat module.

22. The passenger seating arrangement according to claim 21, wherein when the seat module is in the PRM-access configuration, the armrest is in the access position.

23. A passenger seating arrangement in an aircraft cabin, the passenger seating arrangement comprising:
   a column of seat units located adjacent an aisle, the column of seat units and the aisle both extending in a longitudinal direction parallel to the longitudinal axis of the aircraft cabin,
   wherein the column comprises a multiplicity of seat units, arranged consecutively along the longitudinal direction,
   wherein each seat unit comprises:
      a seat module at one end of the seat unit and a foot-receiving structure at the other end of the seat unit, the seat module comprising:
         a seat pan, and
         a seat back,
   wherein each seat unit is configurable between a seating configuration and a flat-bed configuration,
   wherein each seat unit is orientated at an acute angle to the longitudinal direction and faces outwardly away from the aisle,
   wherein the spacing between a seat pan of a seat unit in the column and a shroud of a neighboring seat unit in the column defines an access opening for accessing that seat unit from the aisle,
   wherein the access opening has a first width for access by an able-bodied passenger,
   wherein the seat unit, or the neighboring seat unit, is configurable into a person of reduced mobility (PRM)-access configuration in which the seat module is moved via a rotational movement about an axis of rotation to temporarily widen the access opening from the first width to a second width, greater than the first width, for enabling a disabled passenger to access the seat unit, and
   wherein the seat module is configured to rotate an amount of at least 21 degrees about the axis of rotation into and out of the PRM-access configuration.

24. The passenger seating arrangement according to claim 23, wherein the acute angle to the longitudinal direction is between 41 and 48 degrees,
   wherein a pitch between consecutive seat units in the column is between 31 and 35 inches, and
   wherein the amount of at least 21 degrees is 21 degrees or 23 degrees.

25. The passenger seating arrangement according to claim 23, wherein each seat unit comprises a fixed armrest on a side of the seat unit furthest from the aisle, the armrest being arranged to overhang a leg-receiving region of the neighboring seat, on the side of the neighboring seat unit closest to the aisle,
   wherein each seat unit comprises:
      the leg receiving region; and
      a feet-access recess partly formed by the seat module and partly formed by fixed side furniture, and
   wherein the fixed side furniture comprising a wall comprising:
      a first inflection at a transition between the feet-access recess and the leg receiving region; and
      a second inflection at the transition between the leg receiving region and the armrest of the neighboring seat unit.

* * * * *